United States Patent
Oh et al.

(10) Patent No.: US 9,785,379 B2
(45) Date of Patent: Oct. 10, 2017

(54) OPERATING METHOD OF NONVOLATILE MEMORY DEVICE AND NONVOLATILE MEMORY SYSTEM

(71) Applicant: SAMSUNG ELECTRONICS CO., LTD., Suwon-si (KR)

(72) Inventors: Eun Chu Oh, Hwaseong-si (KR); JongHa Kim, Seongnam-si (KR); Junjin Kong, Yongin-si (KR); Hong Rak Son, Anyang-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 156 days.

(21) Appl. No.: 14/616,153

(22) Filed: Feb. 6, 2015

(65) Prior Publication Data

US 2015/0220283 A1 Aug. 6, 2015

(30) Foreign Application Priority Data

Feb. 6, 2014 (KR) .................. 10-2014-0013742

(51) Int. Cl.
*G06F 3/06* (2006.01)
*G06F 12/00* (2006.01)

(52) U.S. Cl.
CPC ............ *G06F 3/0656* (2013.01); *G06F 3/061* (2013.01); *G06F 3/0679* (2013.01); *G06F 12/00* (2013.01)

(58) Field of Classification Search
CPC .. G06F 12/0246; G06F 3/0679; G06F 3/0688; G06F 3/0619; G06F 3/0656; G06F 3/0608; G06F 3/061; G06F 12/00
See application file for complete search history.

(56) References Cited

U.S. PATENT DOCUMENTS

| | | | |
|---|---|---|---|
| 7,755,950 B2 | 7/2010 | Yu et al. | |
| 8,355,280 B2 * | 1/2013 | Yoon | G11C 11/56 365/185.03 |
| 2008/0177934 A1 | 7/2008 | Yu et al. | |
| 2010/0103735 A1 | 4/2010 | Kim et al. | |
| 2010/0318724 A1 | 12/2010 | Yeh | |
| 2012/0155182 A1 | 6/2012 | Kim et al. | |
| 2012/0173800 A1 * | 7/2012 | Yoon | G06F 12/0246 711/103 |
| 2012/0320673 A1 | 12/2012 | Kwak | |

(Continued)

FOREIGN PATENT DOCUMENTS

| | | |
|---|---|---|
| KR | 10-2008-0038932 A | 5/2008 |
| KR | 10-2011-0001098 A | 1/2011 |
| KR | 10-2011-0065757 A | 6/2011 |

*Primary Examiner* — Hashem Farrokh
(74) *Attorney, Agent, or Firm* — Sughrue Mion, PLLC

(57) ABSTRACT

An operating method of a nonvolatile memory device which includes receiving a plurality of sub-page data and a write command from an external device; performing a pre-main program operation such that at least one of the plurality of sub-page data is stored in the second plurality of memory cells included in the main region; performing a buffered program operation such that other received sub-page data is stored in the first plurality of memory cells included in the buffer region; and performing a re-main program operation such that the received sub-page data subjected to the buffered program operation at the buffer region is stored in the second plurality of memory cells subjected to the pre-main program operation.

14 Claims, 15 Drawing Sheets

(56) References Cited

U.S. PATENT DOCUMENTS

| | | |
|---|---|---|
| 2013/0024609 A1 | 1/2013 | Gorobets et al. |
| 2013/0132644 A1 | 5/2013 | Choi et al. |
| 2013/0135934 A1* | 5/2013 | Kim .................... G11C 11/5621 |
| | | 365/185.18 |
| 2013/0173844 A1* | 7/2013 | Chen ................... G06F 12/0246 |
| | | 711/103 |
| 2015/0154069 A1* | 6/2015 | Tuers .................. G06F 11/1072 |
| | | 714/773 |

* cited by examiner

OPERATING METHOD OF NONVOLATILE MEMORY DEVICE AND NONVOLATILE MEMORY SYSTEM

CROSS-REFERENCE TO RELATED APPLICATION

This application claims priority from Korean Patent Application No. 10-2014-0013742, filed on Feb. 6, 2014, in the Korean Intellectual Property Office, the entire contents of which are hereby incorporated by reference.

BACKGROUND

1. Field

At least some exemplary embodiments described herein relate to semiconductor memories and, more particularly, relate to nonvolatile memory devices and methods of operating the same.

2. Description of the Related Art

Semiconductor memory device are memory devices implemented using semiconductors such as silicon (Si), germanium (Ge), gallium arsenide (GaAs), and indium phosphide (InP). In general, semiconductor memory devices are classified into volatile memory devices and nonvolatile memory devices.

The volatile memory devices may lose their stored data when their power supplies are interrupted. Volatile memory devices include a static RAM (SRAM), a dynamic RAM (DRAM), a synchronous DRAM (SDRAM), and the like. Nonvolatile memory devices retain their stored data even when their power supplies are interrupted. Nonvolatile memory devices include a read only memory (ROM), a programmable ROM (PROM), an electrically programmable ROM (EPROM), an electrically erasable and programmable ROM (EEPROM), a flash memory, a phase-change RAM (PRAM), a resistive RAM (RRAM), a ferroelectric RAM (FRAM), and the like.

With the recent advance in semiconductor technology, solid-state drives (SSDs) based on flash memory have been developed. Flash memory has the advantage of higher operating speed, lower power consumption, and lower noise than the conventional hard disk drive (HDD). However, the operating speed of flash memory is lower than the signal processing speed of a host or an application processor (AP) and signal transmission speed of an interface. Accordingly, various technologies have been developed to overcome the above disadvantage.

SUMMARY

The present disclosure provides a nonvolatile memory device and an operating method thereof.

An aspect of an exemplary embodiment is directed to providing an operating method of a nonvolatile memory device which includes a buffer region including a first plurality of memory cells and a main region including a second plurality of memory cells. The method comprises receiving a plurality of sub-page data and a write command from an external device; performing a pre-main program operation such that at least one of the plurality of sub-page data is stored in the second plurality of memory cells included in the main region; performing a buffered program operation such that other received sub-page data is stored in the first plurality of memory cells included in the buffer region; and performing a re-main program operation such that the received sub-page data subjected to the buffered program operation at the buffer region is stored in the second plurality of memory cells subjected to the pre-main program operation. Each of the first plurality of memory cells in the buffer region stores N-bit data, each of the second plurality of memory cells in the main region stores M-bit data, each of the plurality of sub-page data indicate data stored in a single page of the nonvolatile memory device, and wherein N is a positive integer and M is a positive integer which is greater than N.

In exemplary embodiments, the performing the re-main program operation comprises reading the received sub-page data, subjected to the buffered program operation, from the buffer region; and performing the re-main program operation such that the read sub-page data is stored in the second plurality of memory cells subjected to pre-main program operation.

In exemplary embodiments, the re-main program operation is an operation to reprogram the other sub-page data into the second plurality of memory cells subjected to the pre-main program operation.

In exemplary embodiments, the write command is an on-chip buffered program (OBP) command.

In exemplary embodiments, the method further comprises receiving an address from the external device, wherein the pre-main program operation is performed such that the at least one of the plurality of sub-page data is stored in a third plurality of memory cells which correspond to the address among the second plurality of memory cells in the main region.

In exemplary embodiments, the method further comprises receiving a buffer address from the external device, wherein the buffered program operation is performed such that the other sub-page data is stored in a third plurality of memory cells which correspond to the buffer address among the first plurality of memory cells in the buffer region.

In exemplary embodiments, the nonvolatile memory device includes a memory cell array including the buffer region and the main region, and the memory cell array includes a plurality of cell strings, wherein each of the plurality of cell strings includes a third plurality of memory cells which is stacked to be perpendicular to a substrate, a ground selection transistor provided between the third plurality of memory cells and the substrate, and a string selection transistor provided between the third plurality of memory cells and a bitline.

In exemplary embodiments, the pre-main programming and the re-main programming are performed based on bit ordering which indicates a corresponding relationship between data stored in a memory cell in the main region and a plurality of program states.

In exemplary embodiments, the at least one sub-page data subjected to the pre-main programming is predetermined sub-page data which satisfies a reference condition, wherein the reference condition indicates a condition in which an upper limit of a threshold voltage distribution of a program state of the second plurality of memory cells subjected to the pre-main programming is made maximum.

Another aspect of an exemplary embodiment is directed to providing a nonvolatile memory system. The nonvolatile memory system comprises a nonvolatile memory device including a buffer region and a main region, each of the buffer region and the main region including a plurality of memory cells; and a memory controller configured to control the nonvolatile memory device. The memory controller is configured to receive a plurality of sub-page data from an external device, select sub-page data to be subjected to pre-main program operation at the main region among the plurality of sub-page data, control the nonvolatile memory device such that the selected sub-page data is subjected to pre-main program operation at the memory cells in the buffer region, control the nonvolatile memory device such that except for the selected sub-page data, other sub-page data is subjected to buffered program operation at the buffer region, and control the nonvolatile memory such that the sub-page data subjected to the buffered program operation at the buffer region is subjected to re-main program operation at the memory cells subjected to the pre-main program operation.

In exemplary embodiments, the memory cells in the buffer region are multi-level cells storing N-bit data and the memory cells in the main region are multi-level cells to store M-bit data, and wherein N is a positive integer and M is a positive integer greater then N.

In exemplary embodiments, the memory controller includes a selector configured to select the sub-page data to be subjected to pre-main program operation at the main region among the plurality of sub-page data based on bit ordering which indicates a corresponding relationship between data stored in a memory cell in the main region and a plurality of program states.

In exemplary embodiments, the memory controller is configured to control the nonvolatile memory to perform the pre-main program operation, the buffered program operation, and the re-main program operation based on information of the selected sub-page data.

In exemplary embodiments, the nonvolatile memory device includes a memory cell array which includes the buffer region and the main region; a page buffer connected to the memory cell array through a plurality of bitlines and configured to temporarily store the plurality of sub-page data read from the memory cells in the buffer region; an address decoder connected to the memory cell array through a plurality of wordlines and configured to select at least one of the plurality of wordlines based on an address received from the external device; and a control logic circuit configured to, according to control of the memory controller, control the page buffer and the address decoder such that the selected sub-page data is subjected to pre-main program operation at the main region, control the page buffer and the address decoder such that the other sub-page data, among the plurality of sub-page data, is subjected to buffered program operation at the buffer region, and control the page buffer and the address decoder such that the plurality of sub-page data subjected to the buffered program operation at the buffer region is subjected to re-main program operation at the main region subjected to the pre-main program operation.

In exemplary embodiments, the memory cell array includes a plurality of strings, and wherein each of the strings includes a plurality of memory cells which is stacked to be perpendicular to a substrate; a ground selection transistor provided between the substrate and the plurality of memory cells which is stacked to be perpendicular to the substrate; and a string selection transistor provided between the plurality of memory cells which is stacked to be perpendicular to the substrate and the bitline.

Still another aspect of an exemplary embodiment is directed to providing a nonvolatile memory system. The nonvolatile memory system includes a nonvolatile memory device including a buffer region and a main region; and a memory controller configured to receive data from an external device, to store a part of the received data in the buffer region, and to store rest of the received data in the main region. The memory controller is configured to store the part of the received data, which is stored in the buffer region, in a plurality of memory cells which store the rest of the received data among a plurality of memory cells in the main region.

In exemplary embodiments, each of the buffer region and the main region comprises a plurality of memory cells, wherein each of the plurality of memory cells in the buffer region is configured to store N-bits data, and each of the plurality of memory cells in the main region is configured to store M-bits data, wherein N is a positive integer and M is a positive integer greater than N.

In exemplary embodiments, the memory controller includes a selector configured to determine the part of the received data based on bit ordering which indicates a corresponding relationship between data stored in one of the plurality of memory cells in the main region and a plurality of program states; and a reorderer configured to reorder the part of the received data based on a determination result of the selector, wherein the memory controller is configured to transfer the reordered part of the received data to the nonvolatile memory device.

In exemplary embodiments, the nonvolatile memory device is configured to perform a first program operation such that the part of the received data is stored in the buffer region, and to perform a second program operation such that the rest of the received data is stored in the main region, and wherein operation time of the first program operation is shorter than that of the second program operation.

In exemplary embodiments, the nonvolatile memory device is configured to read the part of the received data stored in the buffer region, and to perform a third program operation such that the read part of the received data is stored in the memory cells storing the rest of the received data among the plurality of memory cells in the main region under a control of the memory controller.

BRIEF DESCRIPTION OF THE DRAWINGS

Example embodiments will become more apparent in view of the attached drawings and accompanying detailed description. The example embodiments depicted therein are provided by way of example, not by way of limitation, wherein like reference numerals refer to the same or similar elements. The drawings are not necessarily to scale, and emphasis is being placed on illustrating aspects of the example embodiments.

DETAILED DESCRIPTION OF THE EXEMPLARY EMBODIMENTS

Figure 1:
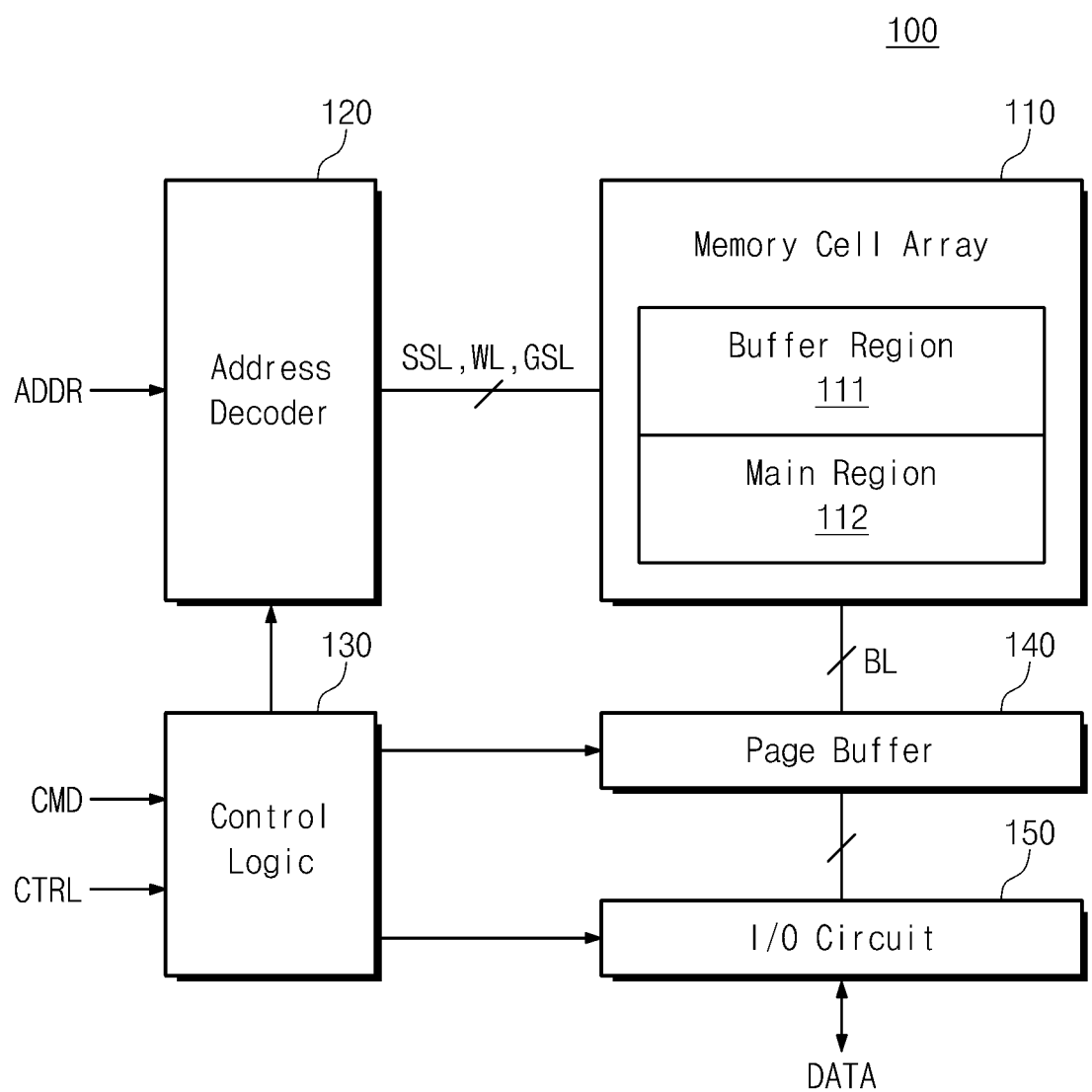
FIG. 1 is a block diagram of a nonvolatile memory device according to an exemplary embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

It will be understood that, although the terms first, second, third etc. may be used herein to describe various elements, these elements should not be limited by these terms. These terms are used to distinguish one element from another. Thus, a first element discussed below could be termed a second element without departing from the teachings of inventive concepts.

It will be understood that when an element, such as a layer, a region, or a substrate, is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

The terminology used herein is for the purpose of describing particular example embodiments only and is not intended to be limiting of the exemplary embodiments. As used herein, the singular forms "a," "an" and "the" are intended to include the plural forms as well, unless the context clearly indicates otherwise. It will be further understood that the terms "comprises", "comprising", "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram of a nonvolatile memory device 100 according to an exemplary embodiment. Referring to FIG. 1, the nonvolatile memory device 100 includes a memory cell array 110, an address decoder 120, a control logic 130, a page buffer 140, and an input/output (I/O) circuit 150.

The memory cell array 110 includes a buffer region 111 and a main region 112. The buffer region 111 is a region in which data received from an external device (e.g., memory controller) is temporarily stored. The main region 112 is a region in which data stored in the buffer region 111 is main-programmed to be store. In some embodiments, the nonvolatile memory device 110 may read data stored in the buffer region 111 and reprogram the read data into the main region 112. This sequence of program operations is referred to as on-chip buffered programming.

The memory cell array 110 is connected to the address decoder through a plurality of wordlines WL and connected to the page buffer 140 through a plurality of bitlines BL. The memory cell array 110 may include a plurality of memory blocks. In some exemplary embodiments, a plurality of memory blocks may have a three-dimensional structure. Each of the memory blocks includes a plurality of memory cells. Each of the memory cells may be provided as a single-level cell (SLC) storing 1 bit of data or a multi-level cell (MLC) storing at least two bits of data. The memory cells are connected to a plurality of wordlines WL. In some embodiments, each of the buffer region 111 and the main region 112 may include a plurality of memory blocks. Alternatively, each of the buffer region 111 and the main region 112 may be divided into physical regions. Alternatively, the buffer region 111 and the main region 111 may be divided into logical regions by management of an external device (e.g., memory controller). In some exemplary embodiments, the buffer region 111 may be included in the same chip as the main region 112 to be provided to an on-chip buffer.

In some exemplary embodiments, each of memory cells in the buffer region 111 may operate as a single-level cell (SLC) storing 1 bit of data, and each of memory cells in the main region 112 may operate as a multi-level cell (MLC) storing at least two bits of data. Alternatively, each of the memory cells in the buffer region 111 may operate as a multi-level cell (MLC) storing N bits of data, and each of the memory cells in the main region 112 may operate as a multi-level cell (MLC) storing M bits of data (M being a positive integer greater than N).

The address decoder 120 may be connected to the memory cell array 110 through a plurality of wordlines WL, string selection lines SSL, and ground selection lines GSL. The address decoder 120 may receive an address ADDR from en external device and decode the received address ADDR. The address decoder 120 may control a wordline voltage of the wordlines WL, based on a decoded address.

The control logic 130 may receive a command CMD and a control signal CTRL from an external device and control the address decoder 120, the page buffer 140, and the I/O circuit 150 in response to the received signals.

The page buffer 140 may be connected to the memory cell array 110 through a plurality of bitlines BL. The page buffer 140 may temporarily store data received from the I/O circuit 150 or data read from the memory cell array 110.

The I/O circuit 150 may receive data from an external device or transmit data to an external device.

In some exemplary embodiments, the data may include a plurality of page data PD. The page data PD may include a plurality of sub-page data sPD. The sub-page data sPD includes data corresponding to a single page. For example, when each of the memory cells of the main memory 112 may operate as a multi-level cell (MLC) storing 2 bits of data, page data PD may include first sub-page data corresponding to a most significant bit (MSB) and second sub-page data corresponding to a least significant bit (LSB).

In some exemplary embodiments, the nonvolatile memory device 100 may write data received from an external device into the buffer region 111. The nonvolatile memory device 100 may read data, written into the buffer region 111, and rewrite the read data into the main region 112. Hereinafter, for ease of description, an operation of programming data into the buffer region 111 will be referred to as buffered-program operation (BP), and an operation of reprogramming data stored in the buffer region 111 into the main region 112 will be referred to as main-program operation (MP). In some exemplary embodiments, the buffered-program operation (BP) may be a program operation of a single-level cell (SLC) and the main-program operation (MP) may be a program operation of a multi-level cell (MLC). Alternatively, program time of the buffered-program operation (BP) may be shorter than that of the main-program operation (MP).

Figure 2:
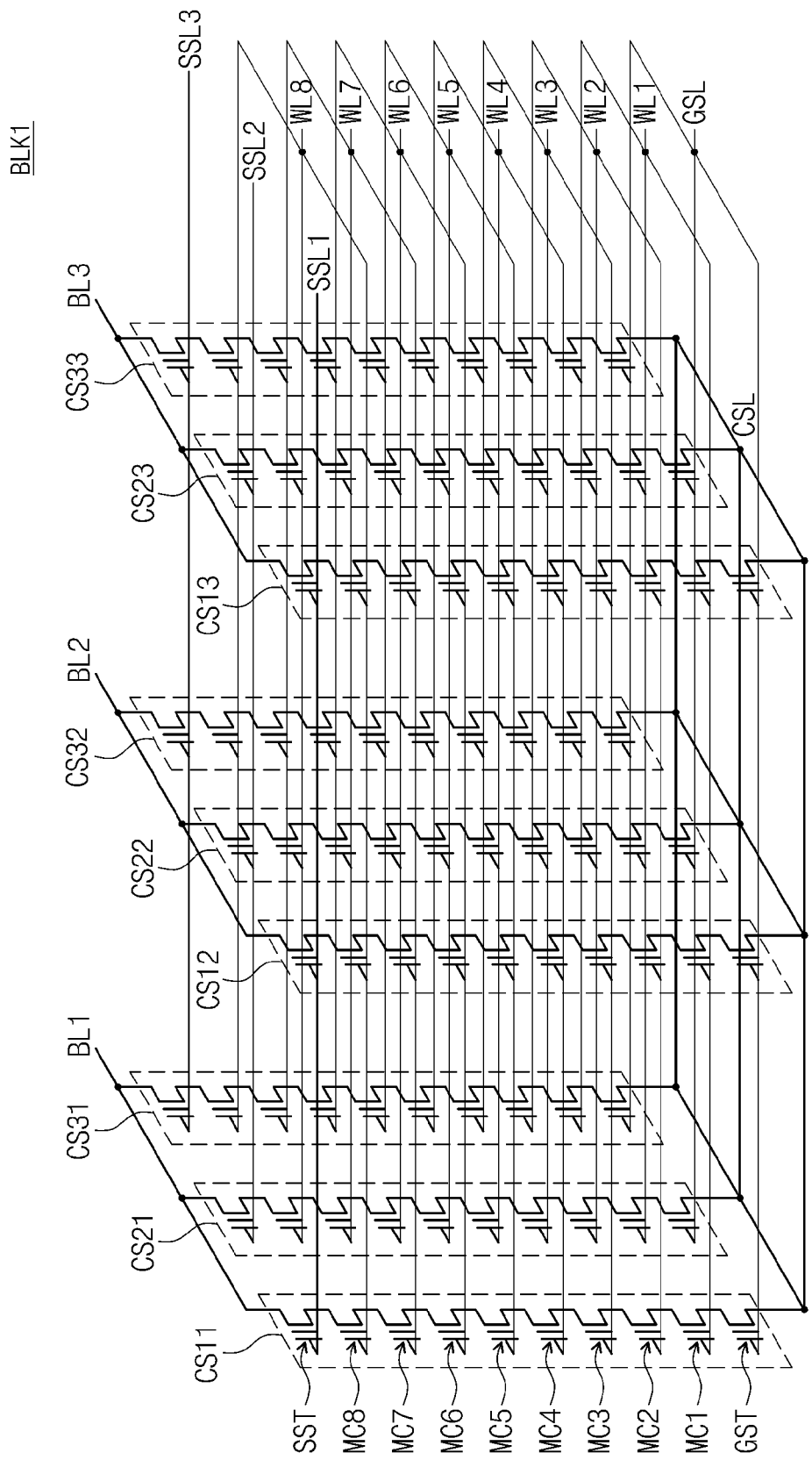
FIG. 2 is a circuit diagram showing one of blocks included in a cell array in FIG. 1.

FIG. 2 is a circuit diagram showing one of the blocks included in a cell array in FIG. 1. Referring to FIG. 2, cell strings CS11 to CS33 are coupled between bitlines BL1 to BL3 and a common source line CSL. Each cell string (e.g., CS11) includes a string selection transistor SST, a plurality of memory cells MC1 to MC8, and a ground selection transistor GST.

The string selection transistor SST is connected to string selection lines SSL1 to SSL3. A plurality of memory cells MC1 to MC8 are connected to corresponding wordlines WL1 to WL8, respectively. The ground selection transistor GST is connected to a ground selection line GSL. The string selection transistor SST is connected to a bitline BL, and the ground selection transistor GST is connected to a common source line CSL.

The nonvolatile memory device 100 may program data in units of memory cells connected to the wordlines WL1 to WL8. For example, a wordline (e.g., WL1), of the same height, is commonly connected and string selection lines SSL1 to SSL3 are separated. When memory cells connected to the first wordline WL1 and belonging to the cell strings CS11, CS12, and CS13 are programmed, the first wordline WL1 and the first selection line SSL1 are selected. The nonvolatile memory device 100 may program one or two or more sub-page data into memory cells connected to the selected first wordline WL1. In this case, the nonvolatile memory device 100 may perform a program operation based on an MLC programming scheme or a high-speed programming (HSP) scheme. The HSP scheme is a scheme to program two or more sub-page data through a program operation performed once.

Figure 3:
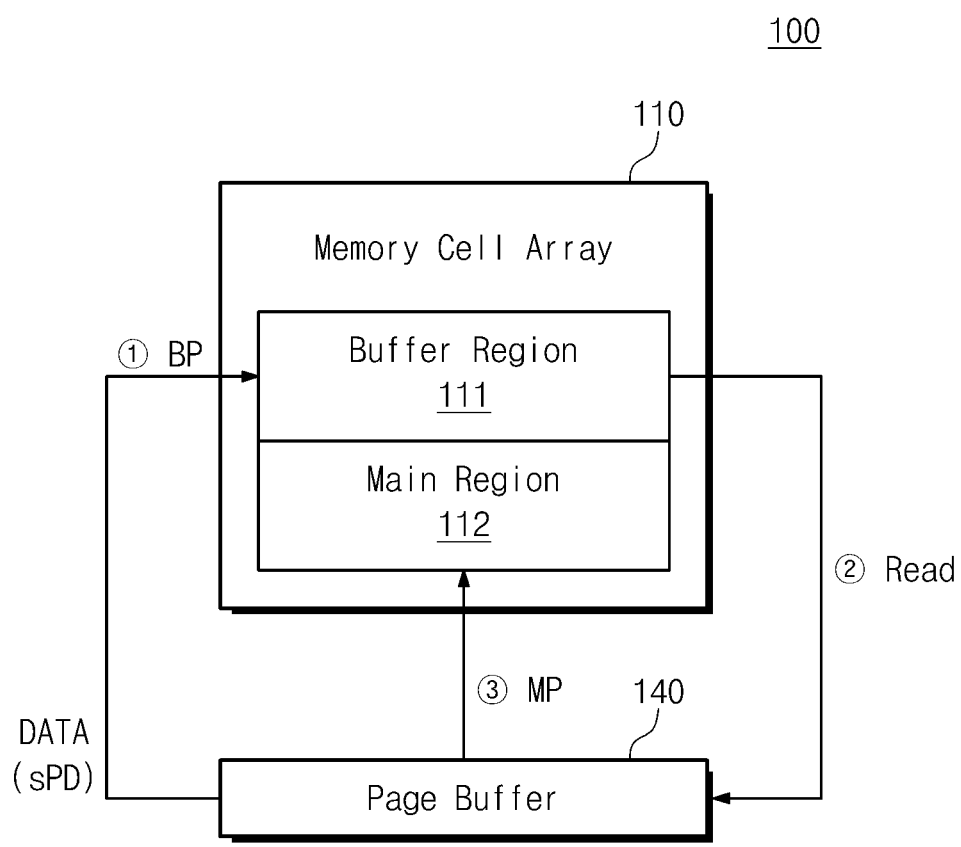
FIGS. 3 and 4 illustrate a buffer program and a main program of the nonvolatile memory device in FIG. 1.
Figure 4:
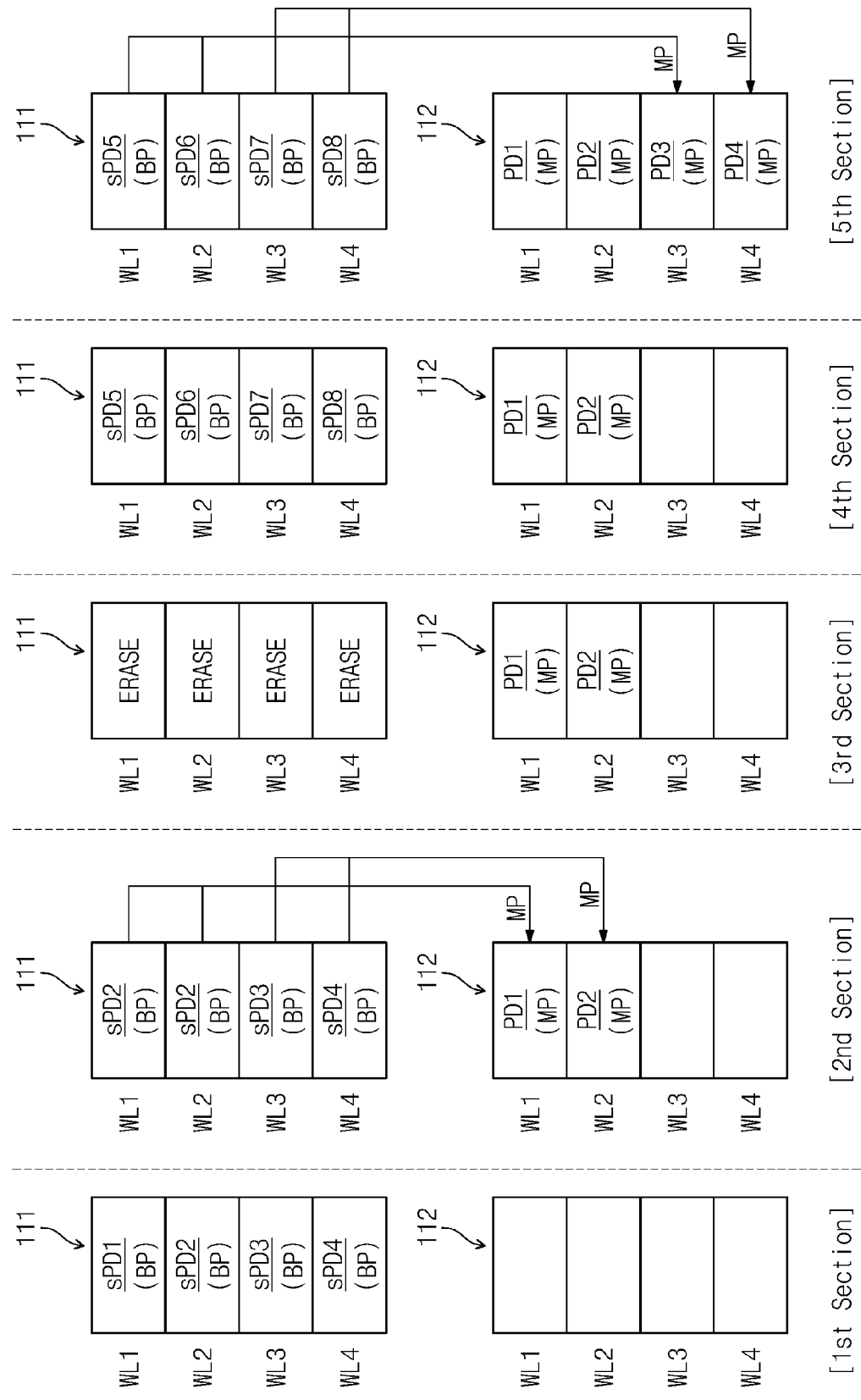

FIGS. 3 and 4 illustrate a buffer program and a main program of the nonvolatile memory device 100 in FIG. 1. For ease of description, components that are unnecessary to explain a buffer program (BP) and a main program (MP), are omitted. It will be assumed that each of the buffer region 111 and the main region 112 includes a single memory block, and the single memory block includes a plurality of memory cells connected to first to fourth wordlines WL1 to WL4.

In addition, it will be assumed that each of the memory cells in the buffer region 111 operates as a single-level cell (SLC) storing 1 bit of data, and each of the memory cells in the main region 112 operates as a multi-level cell (MLC) storing 2 bits of data.

It will be assumed that the nonvolatile memory device 100 receives first to eighth sub-page data sPD1 to sPD8, and store the received sub-page data sPD1 to sPD8 in the main region 112 as first to fourth page data PD1 to PD4.

In some exemplary embodiments, page data PD may include a plurality of sub-page data sPD. The sub-page data sPD may indicate data corresponding to a single page. For example, each of memory cells in the buffer region 111 and the main region 112 may be a multi-level cell (MLC) storing data including a plurality of bits. The page data PD may indicate data stored in memory cells connected to a single wordline. The sub-page data sPD may be data including one of the bits that are stored in each of the memory cells connected to the single wordline. That is, when memory cells in the main region 112 each operate as a multi-level cell storing 2 bits of data, the page data PD may include first sub-page data including a most significant bit (MSB) and second sub-page data including a least significant bit (LSB). However, the exemplary embodiments are not limited thereto.

Referring to FIGS. 1 to 4, a memory cell array 110 includes a buffer region 111 and a main region 112. During a program operation, the nonvolatile memory device 100 may perform buffered-program operation (BP) such that data received from an external device (e.g., memory controller) is programmed at the buffer region 111 (see (1) in FIG. 3). For example, the nonvolatile memory device 100 may receive first to fourth sub-page data sPD1 to sPD4 from an external device. As shown in a first section in FIG. 4, the nonvolatile memory device 100 may perform buffered-program operation (BP) such that the received first to fourth sub-page data sPD1 to sPD4 are programmed at the buffer region 111. In some exemplary embodiments, since each of memory cells in the buffer region 111 operates as a single-level cell (SLC), the first to fourth sub-page data sPD1 to sPD4 will be programmed at memory cells connected to different wordlines, respectively.

Then, the nonvolatile memory device 100 may read data (i.e. sPD1 to sPD4) stored in the buffer region 111 (see (2) in FIG. 3), and may perform main-program operation (MP) such that the read data is programmed at the main region 112 (see (3) in FIG. 3). For example, as shown in a second section in FIG. 4, the nonvolatile memory device 100 may read the first to fourth sub-page data sPD1 to sPD4 stored in the buffer region 111 and may perform main-programming (MP) such that the read first to fourth sub-page data sPD1 to sPD4 are programmed at the main region 112. Since each of memory cells in the main region 112 operates as a multi-level cell (MLC) storing 2 bits of data, the first and second sub-page data sPD1 and sPD2 are stored in memory cells connected to a first wordline WL1 in the main region 112 as first data page PD1. In addition, the third and fourth sub-page data sPD3 and sPD4 are stored in memory cells connected to a second wordline WL2 in the main region 112 as second page data PD2. In some exemplary embodiments, the nonvolatile memory device 100 may perform a main-program operation (MP) according to the control of an external device (e.g., memory controller).

Then, the buffer region 111 may be erased, as shown in a third section in FIG. 4.

Then, the nonvolatile memory device 100 may receive data from an external device and perform buffered-programming (BP) such that the received data is programmed at the erased buffer region 111. For example, the nonvolatile memory device 100 may perform buffered-program operation (BP) such that the received fifth to eighth sub-page data sPD5 to sPD8 are programmed at the buffer region 111, as shown in a fourth section in FIG. 4. In some exemplary embodiments, since each of memory cells in the buffer region 111 operates as a single-level cell (SLC), the fifth to eighth sub-page data sPD5 to sPD8 may be stored in memory cells connected to different wordlines, respectively.

And then, the nonvolatile memory device 100 may read the fifth to eighth sub-page data sPD5 to sPD8 stored in the buffer region 111 and perform main-program operation (MP) such that the read fifth to eighth sub-page data sPD5 to sPD8 are programmed at the main region 112, as shown in a fifth section in FIG. 4. For example, the nonvolatile memory device 100 may perform main-program operation (MP) such that the fifth to sixth sub-page data sPD5 and sPD6 are programmed at cells connected to a third wordline WL3 in the main region 112 as third page data PD3. The nonvolatile memory device 100 may perform main-program operation (MP) such that the seventh to eighth sub-page data sPD7 and sPD8 are programmed at memory cells connected to a fourth wordline WL4 in the main region 112 as fourth page data PD4.

Figure 5:
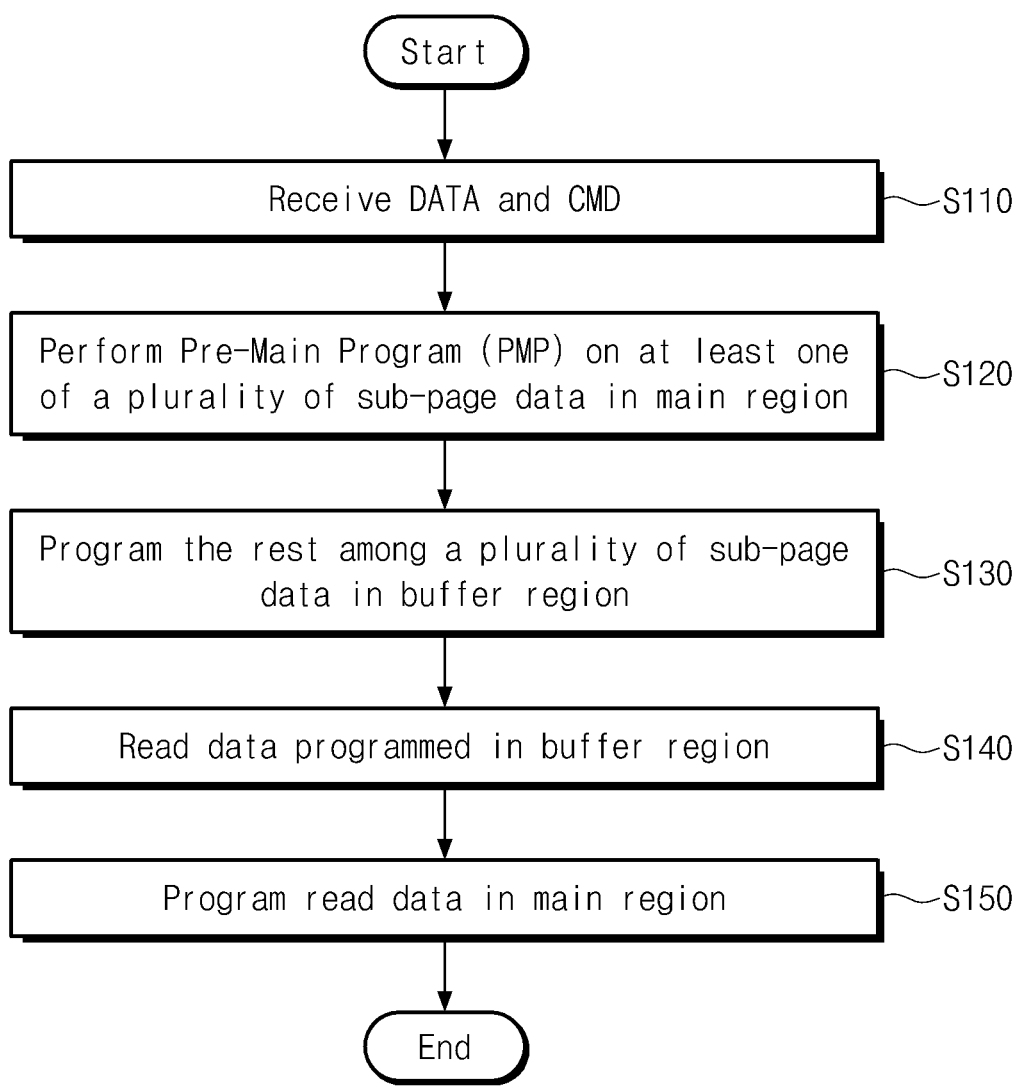
FIG. 5 is a flowchart summarizing an operation of a nonvolatile memory device according to another exemplary embodiment.
Figure 6:
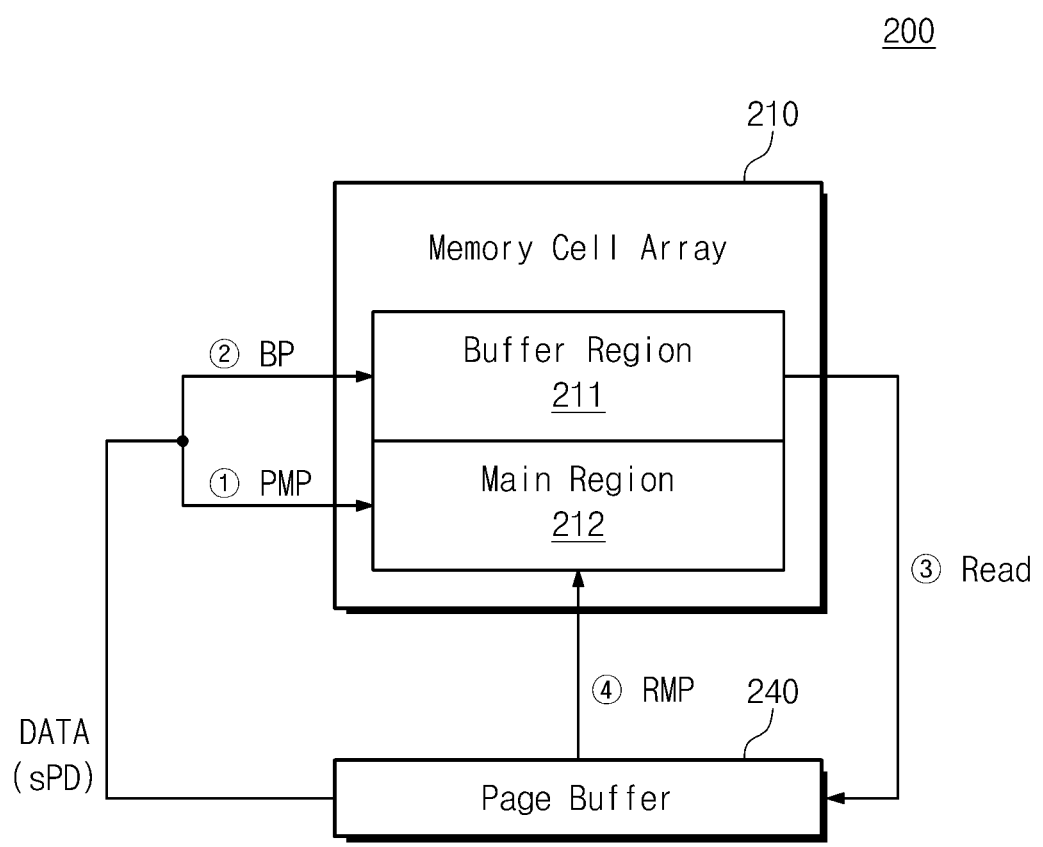
FIGS. 6 and 7 illustrate an operation of the nonvolatile memory device in FIG. 5.
Figure 7:
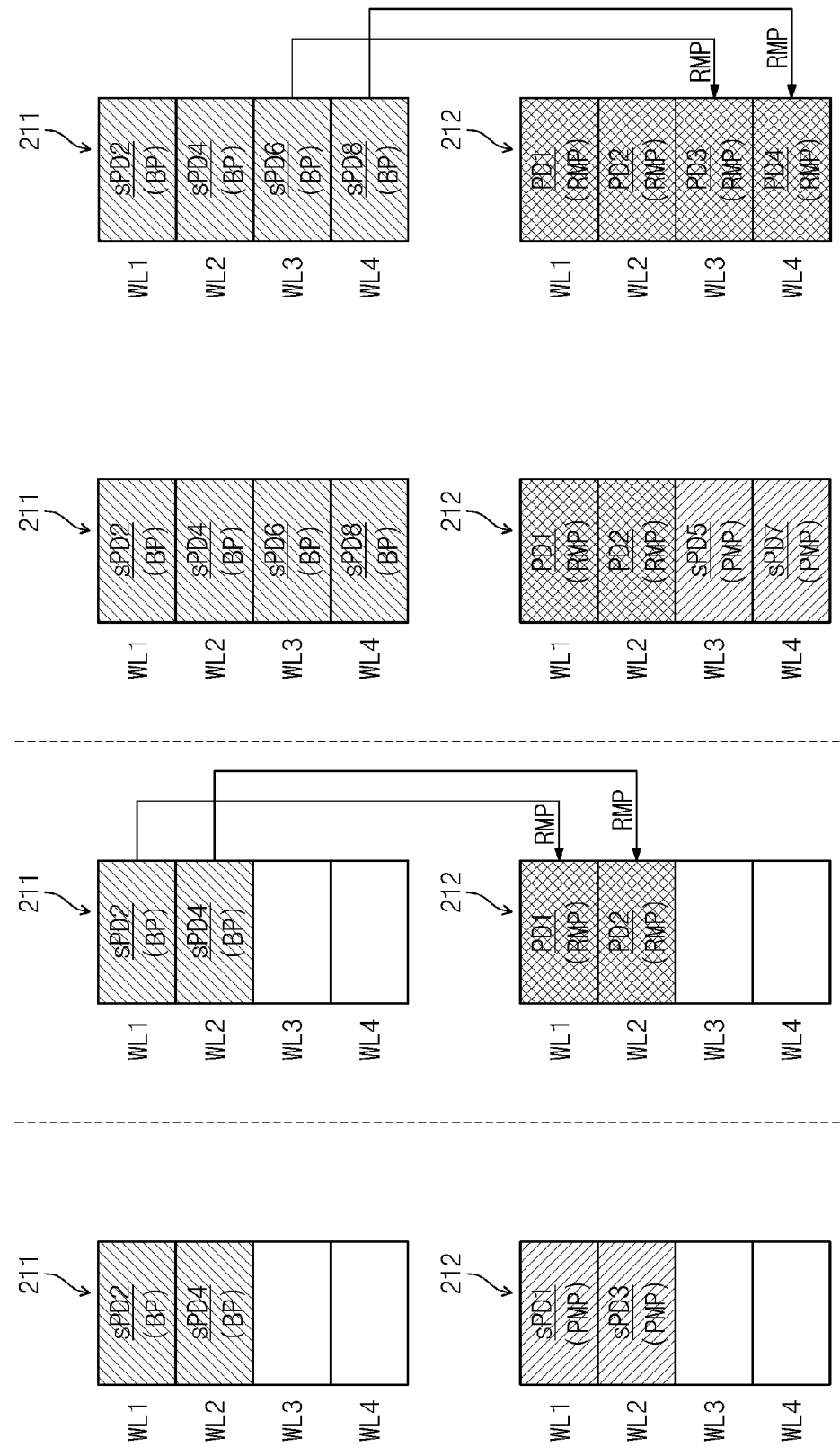

FIG. 5 is a flowchart illustrating an operation of a nonvolatile memory device 200 according to another exemplary embodiment. FIGS. 6 and 7 illustrate an operation of the nonvolatile memory device 200 in FIG. 5.

In some exemplary embodiments, the nonvolatile memory device 200 may program some data (e.g., some sub-page data) of externally received data at a main region 212 and program the other data (e.g., the other sub-page data) at a buffer region 211. Then the nonvolatile memory device 200 may read the other data programmed at the buffer region 211 and reprogram the read data at the main region 212. Hereinafter, an operation of programming some of received data at the main region 212 will be referred to as pre-main program operation (PMP) and an operation of reprogramming data stored in the buffer region 211 at the main region 212 will be referred to as re-main program operation (RPM). In some exemplary embodiments, the re-main program operation (RPM) indicates an operation writing reprogramming data stored in the buffer region 211 at the main region 212 without erase operation.

For ease of description, it will be assumed that each of the buffer region 211 and main region 212 includes a single memory block, and memory cells in the buffer region 211 and main region 212 are connected to first to fourth wordlines WL1 to WL4, respectively. In addition, it will be assumed that each of the memory cells in the buffer regions 211 operates as a single-level cell (SLC) storing 1 bit of data and each of the memory cells in the main region 212 operates as a multi-level cell (MLC) storing 2 bits of data.

In addition, it will be assumed that the nonvolatile memory device 200 receives first to eighth sub-page data sPD1 to sPD8, and stores the received first to eighth sub-page data sPD1 to sPD8 in the main region 212 as first to fourth page data PD1 to PD4. The first page data PD1 may include the first and second sub-page data sPD1 and sPD2, the second page data PD2 may include the third and fourth sub-page data sPD3 and sPD4, the third page data PD3 may include the fifth and sixth sub-page data sPD5 and sPD6, and the fourth page data PD4 may include seventh and eighth sub-page data sPD7 and sPD8. However, the scope of the exemplary embodiments is not limited thereto.

Referring to FIGS. 5 and 6, at S110, the nonvolatile memory device 200 may receive data DATA and a command CMD from an external device (e.g., memory controller). In some exemplary embodiments, the command CMD may be a command indicating an On-chip Buffered Programming (OBP) operation or a command indicating a data write operation. In some embodiments, the data DATA may include a plurality of page data PD. Each of the page data PD may include a plurality of sub-page data sPD. Each of the sub-page data sPD may include a single page (i.e., a single page corresponding to a LSB, CSB, or MSB).

At S120, the nonvolatile memory device 200 may perform pre-main-program operation (PMP) such that at least one of the sub-page data is programmed at the main region 212 (see (1) in FIG. 6).

At S130, the nonvolatile memory device 200 may perform buffered-program operation (BP) such that the remaining sub-page data is programmed at the buffer region 211 (see (2) in FIG. 6).

At S140, the nonvolatile memory device 200 may read the data programmed at the buffer region 211 (see (3) in FIG. 6). For example, the nonvolatile memory device 200 may read the data buffered-programmed at the buffer region 211 at S130.

At S150, the nonvolatile memory device 200 may program the read data at the main region 212 (see (4) in FIG. 6). In some exemplary embodiments, the nonvolatile memory device 200 may perform re-main program operation (RMP) such that the read data is programmed at the main region 212.

The operation of the nonvolatile memory device 200 will now be described in detail hereinafter with reference to FIGS. 5 to 7. Referring to FIGS. 5 to 7, the nonvolatile memory device 200 may receive data from an external device and perform pre-main-program operation (PMP) such that some of the received data is programmed at the main region 212 (see (1) in FIG. 6 and S120 in FIG. 5). The nonvolatile memory device 200 may perform buffered-programming such that the remaining data is programmed at the buffer region 211 (see (2) in FIG. 6 and S130 in FIG. 5).

For example, the nonvolatile memory device 200 may receive first to fourth sub-page data sPD1 to sPD4 from an external device. The nonvolatile memory device 200 may perform pre-main-program operation (PMP) such that the first sub-page data sPD1 is programmed at memory cells connected to the first wordline WL1 among memory cells in the main region 212, as shown in a first section in FIG. 7. The nonvolatile memory device 200 may perform pre-main-program operation (PMP) such that the third sub-page data sPD3 is programmed at memory cells connected to the second wordline WL2 among the memory cells in the main region 212.

The nonvolatile memory device 200 may perform buffered-program operation (BP) such that the second and fourth sub-page data sPD2 and sPD4 are programmed at memory cells connected to the first and second wordlines WL1 and WL2 among the memory cells in the buffer region 211, respectively. In some exemplary embodiments, the first sub-page data sPD1 may include data corresponding to a least significant bit (LSB) of the first page data PD1. The third sub-page data sPD3 may include data corresponding to a least significant bit (LSB) of the second page data PD2.

Then, the nonvolatile memory device 200 may read the data sPD2 and sPD4 stored in the buffer region 211 (see (3) in FIG. 6 and S140 in FIG. 5) and perform re-main-program operation (RMP) such that the read data is stored in the main region 212 (see (4) in FIG. 6 and S150 in FIG. 5). For example, the nonvolatile memory device 200 may read the second and fourth page data sPD2 and sPD4 stored in the buffer region 211 and perform re-main-program operation (RMP) such that the read second and fourth sub-page data sPD2 and sPD4 are stored in the main region 212. At this point, the nonvolatile memory device 200 may perform re-main-programming (RMP) such that the second sub-page data sPD2 is stored in memory cells at which the first sub-page data sPD1 is pre-main-programmed (i.e., memory cells connected to a fifth wordline WL5). That is, the first page data PD1 may be stored in the main region 212 by performing re-main program operation (RMP) such that the second sub-page data sPD2 is stored in memory cells in which the first sub-page data sPD1 is stored.

Then, the nonvolatile memory device 200 may receive the fifth to eighth sub-page data sPD5 to sPD8. The nonvolatile memory device 200 may perform pre-main-program operation (PMP) such that the fifth sub-page data sPD5 is programmed at memory cells connected to the third wordline WL3 among the memory cells in the main region 212 and perform pre-main-program operation (PMP) such that the seventh sub-page data sPD7 is programmed at memory cells connected to the fourth wordline WL4 among the memory cells in the main region 212. The nonvolatile memory device 200 may perform buffered-program operation (BP) such that the sixth and eighth sub-page data sPD6 and sPD8 are programmed at the memory cells connected to the third and fourth wordlines WL3 and WL4 among the memory cells in the buffer region 211, respectively.

Then, the nonvolatile memory device 200 may read the sixth and eighth sub-page data sPD6 and sPD8 stored in the buffer region 211 and may perform re-main-program operation (RPM) such that the read sixth and eighth page data sPD6 and sPD8 are stored in the main region 212, as shown in a fourth section in FIG. 7. For example, the nonvolatile memory device 200 may perform re-main-program operation (RMP) such that the sixth sub-page buffer sPD6 is stored in memory cells at which the fifth sub-page data sPD5 is pre-main-programmed (i.e., memory cells connected to the third wordline WL3). The nonvolatile memory device 200 may perform re-main-program operation (RMP) such that the eighth sub-page data sPD8 is stored in memory cells at which the seventh sub-page data sPD7 is pre-main-programmed (i.e., memory cells connected to the fourth wordline WL4).

According to the above exemplary embodiment, the nonvolatile memory device 200 includes a buffer region 211 and a main region 212. The nonvolatile memory device 200 performs pre-main program operation (PMP) such that some of the data, to be programmed, is written at the main region 212, and performs buffered-programming operation (BP) such that the other data is written at the buffer region 211. The nonvolatile memory device 200 reads the data buffered-programmed at the buffer region 211 and performs re-main-program operation (RMP) such that the read data is stored in the main region 212. Thus, since an On-chip Buffered Programming (OBP) operation may be performed with minimal use of the buffer region 211, a nonvolatile memory device with improved performance and longevity is provided.

Figure 8:
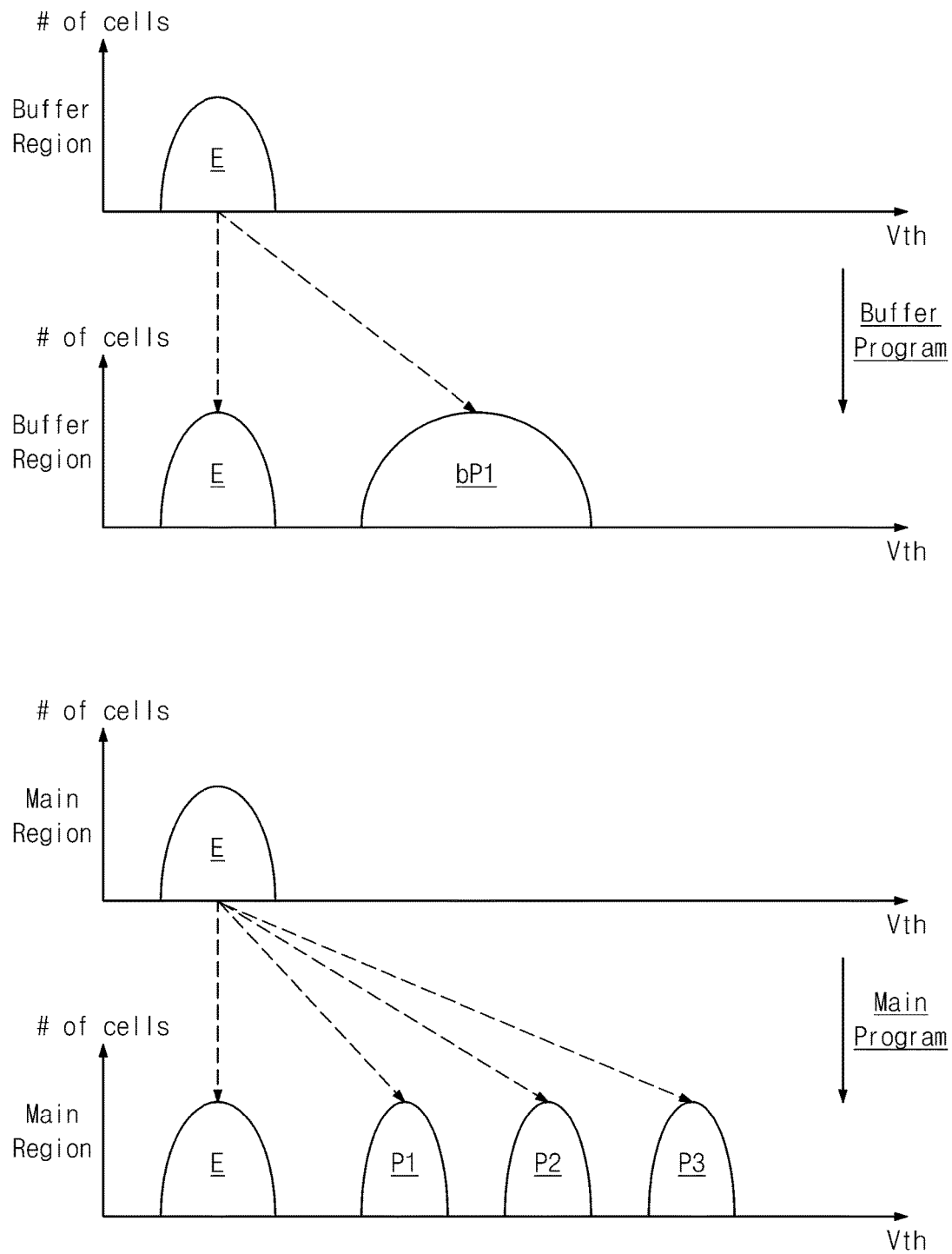
FIGS. 8 and 9 are threshold voltage distribution diagrams illustrating operations of buffered programming, main programming, pre-main programming, and re-main programming.
Figure 9:
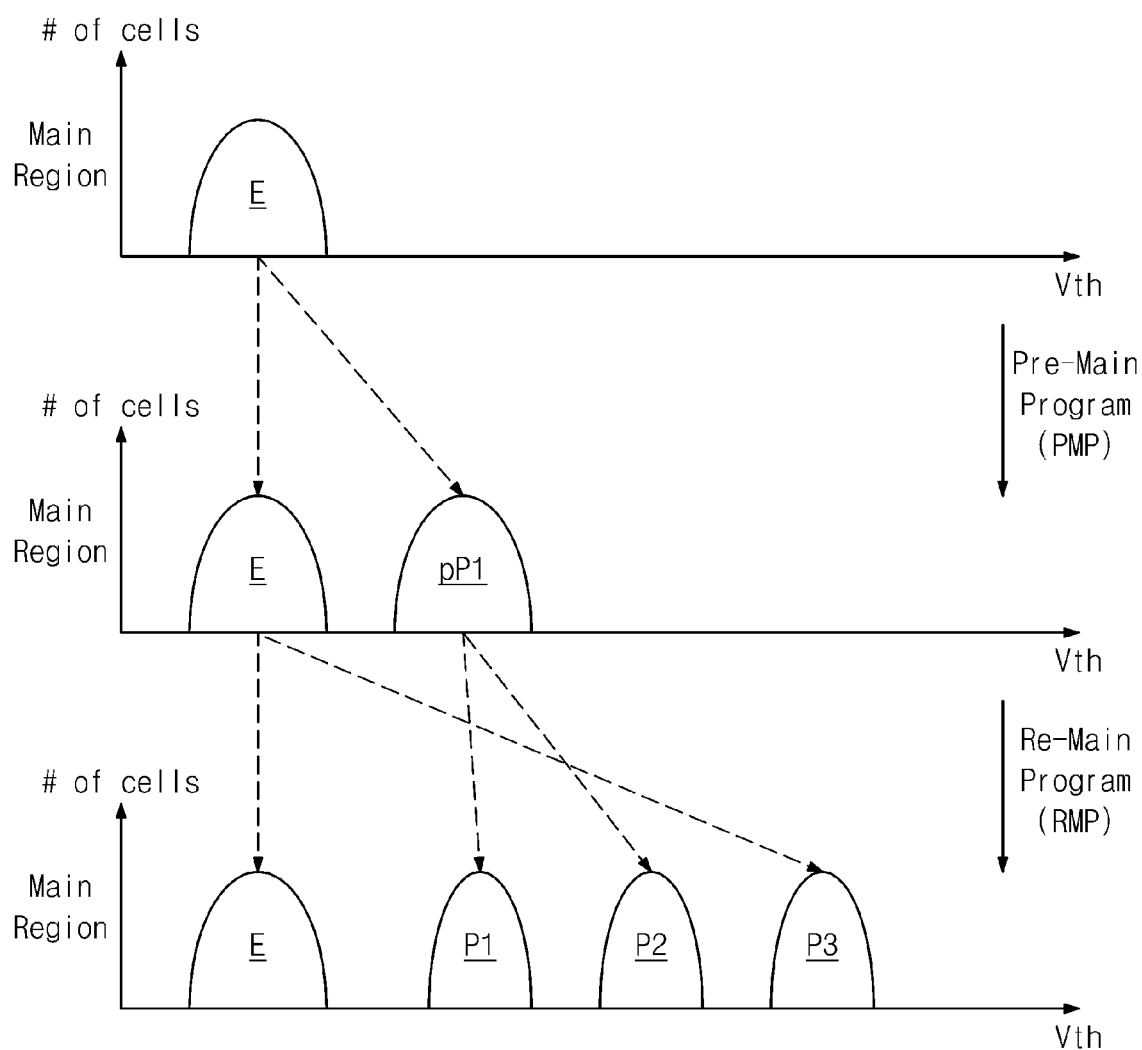

FIGS. 8 and 9 are threshold voltage distribution diagrams illustrating operations of buffered programming, main programming, pre-main programming, and re-main program operations. The buffered program operation (BP) and main program operation (MP) will be exemplarily described with reference to FIG. 8, and the pre-main program operation (PMP) and re-main program operation (RMP) will be exemplarily described with reference to FIG. 9. X-axes of distributions shown in FIGS. 8 and 9 exemplarily denote threshold voltages Vth, and Y-axes of the distributions shown in FIGS. 8 and 9 exemplarily denote the numbers of memory cells. For brevity of description, it will be assumed that memory cells in a buffer region 111 or 211 each operate as a single-level cell (SLC) and memory cells in a main region 112 or 212 each operate as a multi-level cell (MLC). That is, the buffer program operation (BP) may be an SLC program operation and the main program operation (MP) may be an MLC program operation.

Referring to FIGS. 1 and 8, memory cells in the buffer region 111 may be subjected to a buffered program operation (BP) to have one of an erased state E and a buffered-program state bP1. Memory cells in the main region 112 may be subjected to a main program operation (MP) to have one of an erased state E and first to third program states P1 to P3. In order to improve program speed of the buffered program operation (BP), the buffered program operation (BP) is performed such that the buffered-program state bP1 has wider a threshold voltage distribution than the first to third program states P1 to P3. In some embodiments, the nonvolatile memory device 100 may perform main-program operation (MP) based on a high-speed programming scheme (HSP scheme).

Referring to FIGS. 6 and 9, memory cell in the main region 212 may be subjected to pre-main program operation (PMP) to have one of the erased state E and a pre-main-program state pP1. The memory cells subjected to the PMP may be subjected to re-main program (RMP) to have one of the first to third program states P1 to P3.

The pre-main-program state pP1 shown in FIG. 9 has a lower threshold voltage and a wider threshold voltage distribution than the buffered program state bP1 shown in FIG. 8. In other words, the increment of a program pulse of the pre-main-program operation (PMP) may be smaller than that of a program pulse of the buffered-program operation (BP). That is, program time of the PMP may be longer than that of the BP. The re-main main program operation (RMP) shown in FIG. 9 indicates an operation which allows the memory cells, subjected to the PMP, to have one of the erased state E and the first to third program states P1 to P3. That is, since the amount of change in a threshold voltage of memory cells in re-main-program operation (RPM) in FIG. 9 is smaller than that in the main-program operation (MP) shown in FIG. 8, the speed of re-main-program operation (RPM) may be higher than that of main program operation (MP).

As described above, program speed of pre-main-program operation (PMP) may be lower than that of buffered-program operation (BP). However, program speed of re-main-program operation (RMP) is higher than that of main-program operation (MP). Therefore, a higher program speed than a related art OBP operation speed is provided in the exemplary embodiments. Moreover, the use of the buffer region 211 may be minimized to provide a nonvolatile memory device with improved performance and improved longevity.

Figure 10:
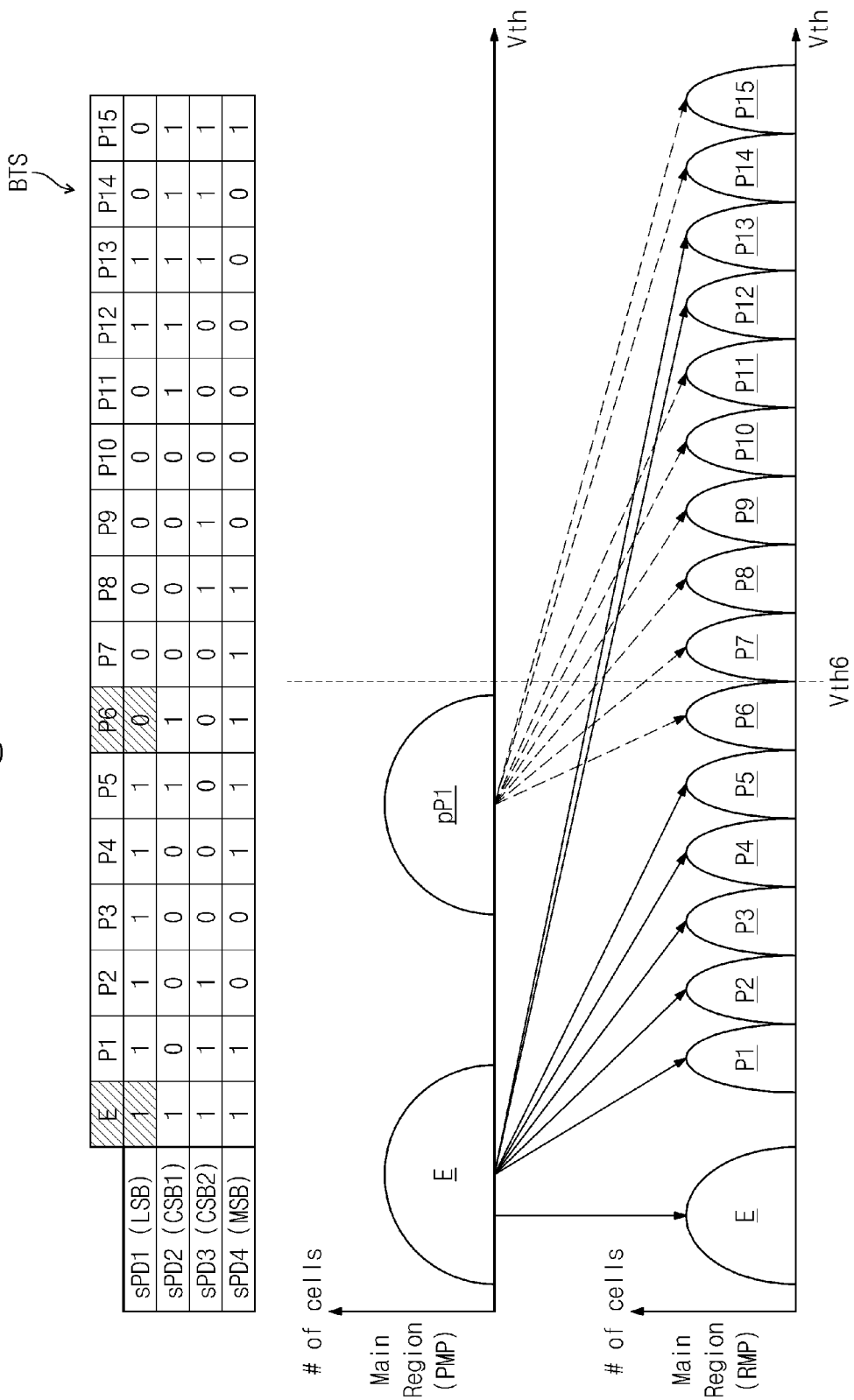
FIG. 10 illustrates an operation of a nonvolatile memory device according to another exemplary embodiment.

FIG. 10 illustrates an operation of a nonvolatile memory device according to another embodiment. In FIG. 10, it will be assumed that each of memory cells in a main region 212 operates as a multi-level cell (MLC or QLC) storing 4 bits of data. In addition, it will be assumed that the nonvolatile memory device 200 performs pre-main program operation (PMP) such that the single sub-page data is written at memory cells connected to a single wordline.

Referring to FIGS. 1 and 10, the nonvolatile memory device 200 may perform a pre-main program operation (PMP) and a re-main program operation (RMP) based on bit ordering (BTS). The bit ordering (BTS) may be 4-bit state ordering which exemplarily shows program states corresponding to first to fourth sub-page data sPD1 to sPD4. For example, the bit ordering (BTS) may indicate a corresponding relationship between 4 bits of data and an erased state E and a plurality of program states P1 to P15, based on 4 bits of data stored in a single memory cell.

In some exemplary embodiments, each of the first to fourth sub-page data sPD1 to sPD4 may include data corresponding to a least significant bit LSB, a first central significant bit CSB1, a second central significant bit CSB2, and a most significant bit MSB.

In some exemplary embodiments, the bit ordering (BTS) may be bit ordering where the amount of logical bit shift between adjacent program states is the least. In some embodiments, an adjacent program state indicates a program state having an adjacent threshold voltage distribution in a threshold voltage distribution of memory cells.

In some exemplary embodiments, the wider the window of a threshold voltage of memory cells subjected to pre-main-program operation (PMP), the more a program speed of the PMP can be improved. For example, when the window of a threshold voltage is narrow, a threshold voltage distribution of pre-main program states may be narrow. In this case, the increment of a program pulse may be reduced in order to narrow the threshold voltage distribution of the memory cells subjected to the PMP. In contrast, when the window of a threshold voltage is wide, a threshold voltage distribution of pre-main-program states may be wider and the increment of a program pulse may be greater than in the case where the window of a threshold voltage is narrow. That is, the wider the window of a threshold voltage of the memory cells subjected to the PMP, the higher program speed of the PMP.

In some exemplary embodiments, logical bits corresponding to an erased state E and a plurality of states P1 to P15 may be decided depending on bit ordering (BTS). At this point, predetermined sub-page data may be subjected to pre-main program operation (PMP) at the main region 212 based on the bit ordering (BTS). In some exemplary embodiments, predetermined sub-page data may be decided in advance to satisfy a reference condition. The reference condition may indicate a condition in which an upper limit of threshold voltage distribution of memory cells subjected to pre-main program operation (PMP) is made maximum. Alternatively, the reference condition may indicate a condition in which the amount of change in a threshold voltage is minimal when memory cells subjected to pre-main program operation (PMP) is subjected to re-main programming (RMP).

For example, first sub-page data sPD1 may be predetermined sub-page data. In some exemplary embodiments, the first sub-page data sPD1 may include data corresponding to a least significant bit LSB. In this case, first sub-page data sPD1 may be sub-page data to satisfy the above-mentioned reference condition. The nonvolatile memory device 200 may perform pre-main program operation (PMP) such that memory cells included in the main region 212 have one of an erased state E and a pre-main program state pP1. The nonvolatile memory device 200 may perform pre-main program operation (PMP) such that memory cells corresponding to data "1", among data included in the first sub-page data sPD1, have the erased state E. The nonvolatile memory device 200 may perform pre-main program operation (PMP) such that memory cells corresponding to data "0", among data included in the first sub-page data sPD1, have the first pre-main program state pP1. In some exemplary embodiments, a threshold voltage distribution of the first pre-main program state pP1 may be smaller than or equal to an upper limit Vth6 of a threshold voltage of a sixth program state P6.

In FIGS. 1 and 10, the nonvolatile memory device 200 may perform re-main program operation (RMP) such that the memory cells having the erased state E have one of the erase state E and first, second, third, fourth, fifth, twelfth, and thirteenth program states P1, P2, P3, P4, P5, P12, and P13. A logical bit of the first sub-page data sPD1 corresponding to the erased state E and the first, second, third, fourth, fifth, twelfth, and thirteenth program states P1, P2, P3, P4, P5, P12, and P13 may be data "1". The first, second, third, fourth, and fifth program states P1, P2, P3, P4, and P5 may be adjacent program states to each other.

The nonvolatile memory device 200 may perform re-main program operation (RMP) such that the memory cells having the first pre-main program state pP1 have one of the sixth, seventh, eighth, ninth, tenth, fourteenth, and fifteenth program states P6, P7, P8, P9, P10, P14, and P15. A logical bit of the first sub-page data sPD1 corresponding to the sixth, seventh, eighth, ninth, tenth, fourteenth, and fifteenth program states P6, P7, P8, P9, P10, P11, P14, and P15 may be data "0". The sixth to eleventh program states P6, P7, P8, P9, P10, and P11 may be adjacent program states at each other. That is, the amount of change in threshold voltage of memory cells may be minimized during the re-main program operation (RMP).

In some exemplary embodiments, a reference condition is a condition in which each upper limit of a threshold voltage of memory cells subjected to pre-main program operation (PMP) is smaller than or equal to an upper limit of a threshold voltage distribution of a reference program state. For example, an upper limit of a threshold voltage distribution of a first pre-main program state pP1 may be smaller than an upper limit Vth6 of a threshold voltage distribution of a sixth program state P6. That is, the sixth program state P6 may be a reference program state for the first pre-main program state pP1.

As described above, the nonvolatile memory device 200 may perform pre-main program operation (PMP) such that predetermined sub-page data is written at the main region 212 to satisfy a reference condition. Thereafter, the nonvolatile memory device 200 may perform re-main program operation (RMP) such that remaining sub-page data is written at the memory cells subjected to the PMP. In some exemplary embodiments, a reference condition indicates a condition in which the window of a threshold voltage of a pre-main program state is made maximum. Thus, since program speed of the pre-main-program operation (PMP) is improved, a nonvolatile memory device with improved performance and improved lifetime is provided.

Figure 11:
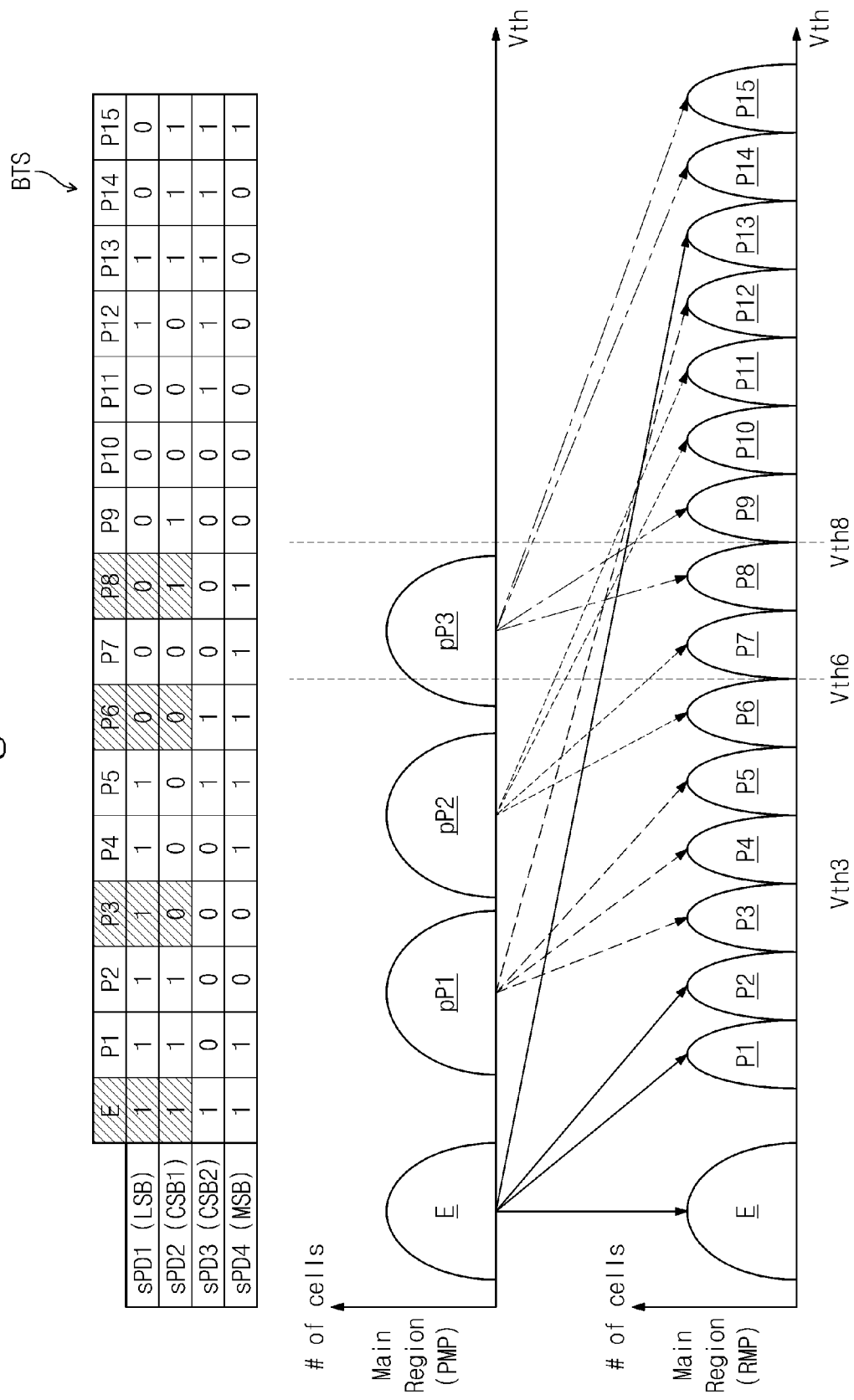
FIG. 11 illustrates an operation of a nonvolatile memory device according to another exemplary embodiment.

FIG. 11 illustrates an operation of a nonvolatile memory device according to still another exemplary embodiment. In FIG. 11, it will be assumed that each of memory cells in a main region 212 operates as a multi-level cell (MLC or QLC) storing 4 bits of data. In addition, it will be assumed that the nonvolatile memory device 200 performs pre-main program operation (PMP) such that two sub-page data is written at memory cells connected to a single wordline.

Referring to FIGS. 1 and 11, the nonvolatile memory device 200 may perform pre-main program operation (PMP) and re-main program operation (RMP) based on bit ordering (BTS). The bit ordering (BTS) has been explained with reference to FIG. 10 and will not be explained in further detail.

As described with reference to FIG. 11, the nonvolatile memory device 200 may perform re-main program operation (PMP) such that at least one predetermined sub-page data is written at the main region 212 to satisfy a reference condition. In some embodiments, logical bits corresponding to an erased state E and a plurality of program states P1 to P15 may be decided depending on bit ordering (BTS). At this point, predetermined sub-page data may be subjected to pre-main program operation (PMP) to be written at the main region 212 based on the bit ordering (BTS). In some embodiments, predetermined sub-page data may be decided in advance to satisfy a reference condition. The reference condition may indicate a condition in which an upper limit of memory cells subjected to pre-main program operation (PMP) is made maximum. Alternatively, the reference condition may indicate a condition in which the amount of change in a threshold voltage is minimal when memory cells subjected to pre-main program operation (PMP) is subjected to re-main programming (RMP).

For example, first and second sub-page data sPD1 and sPD2 may be predetermined sub-page data. In some exemplary embodiments, the first and second sub-page data sPD1 and sPD2 may include data corresponding to a least significant bit LSB and a first central significant bit CSB1, respectively. The first and second sub-page data sPD1 and sPD2 may be predetermined sub-page data to satisfy the above-mentioned reference condition.

The nonvolatile memory device 200 may perform pre-main program operation (PMP) based on the bit ordering (BTS) and the first and second sub-page data sPD1 and sPD2, such that memory cells in the main region 212 have one of the erased state E and first to third pre-main program states pP1, pP2, and pP3. For example, the nonvolatile memory device 200 may perform pre-main program operation (PMP) such that memory cells corresponding to data "11" of the first and second sub-page data sPD1 and sPD2, among memory cells in the main region 212, have the erased state E. The nonvolatile memory device 200 may perform pre-main program operation (PMP) such memory cells corresponding to data "10" of the first and second sub-page data sPD1 and sPD2, among memory cells in the main region 212, have the first pre-main program state pP1. The nonvolatile memory device 200 may perform pre-main program operation (PMP) such that memory cells corresponding to data "00" of the first and second sub-page data sPD1 and sPD2, among memory cells in the main region 212, have the second pre-main program state pP2. The nonvolatile memory device 200 may perform pre-main program operation (PMP) such that memory cells corresponding to data "01" of the first and second sub-page data sPD1 and sPD2, among memory cells in the main region 212, have the third pre-main program state pP3.

In some exemplary embodiments, an upper limit of a threshold voltage distribution of the first pre-main program state pP1 may be smaller than or equal to an upper limit Vth3 of a threshold voltage distribution of the third program state P3. An upper limit of a threshold voltage distribution of the second pre-main program state pP2 may be smaller than or equal to an upper limit Vth6 of a threshold voltage distribution of the sixth program state P6. An upper limit of a threshold voltage distribution of the third pre-main program state pP3 may be smaller than or equal to an upper limit Vth8 of a threshold voltage distribution of the eighth program state P8.

In FIGS. 6 and 11, the nonvolatile memory device 200 may perform re-main program operation (RMP) such that the memory cells having the erased state E have one of the erased state E and first, second, and thirteenth program states P1, P2, and P13. In some exemplary embodiments, the first and second sub-page data sPD1 and sPD2 corresponding to the erased state E and the first, second, and thirteenth program states P1, P2, and P13 are the data "11". The first and second program states P1 and P2 are adjacent program states, at each other.

The nonvolatile memory device 200 may perform re-main program operation (RMP) such that the memory cells having the first pre-main program state pP1 have one of third, fourth, fifth, and twelfth states P3, P4, P5, and P12. In some exemplary embodiments, the first and second sub-page data sPD1 and sPD2 corresponding to the third, fourth, fifth, and twelfth program states P3, P4, P5, and P12 are the data "10". The third to fifth program states P3 to P5 are adjacent program states, at each other.

The nonvolatile memory device 200 may perform re-main program operation (RMP) such that the memory cells having the second pre-main program state pP2 have one of sixth, seventh, tenth, and eleventh P6, P7, P10, and P11. In some embodiments, the first and second sub-page data sPD1 and sPD2 corresponding to the sixth, seventh, tenth, and eleventh P6, P7, P10, and P11 are the data "00". The sixth and seventh program states P6 and P7 are adjacent program states, at each other.

The nonvolatile memory device 200 may perform re-main program operation (RMP) such that the memory cells having the third pre-main program state pP3 have one of eighth, ninth, fourteenth, and fifteenth program states P8, P9, P14, and P15. In some embodiments, the first and second sub-page data sPD1 and sPD2 corresponding to eighth, ninth, tenth, fourteenth, and fifteenth program states P8, P9, P14, and P15 are the data "01". The eighth and ninth program states P8 and P9 are adjacent program states, at each other.

As described above, the nonvolatile memory device 200 may perform pre-main program operation (PMP) for predetermined sub-page data to satisfy a reference condition. Thus, program speed of the pre-main program operation (PMP) may be improved and program speed of re-main program operation (RMP) may also be improved. As a result, a nonvolatile memory device with improved performance and improved lifetime may be provided.

Figure 12:
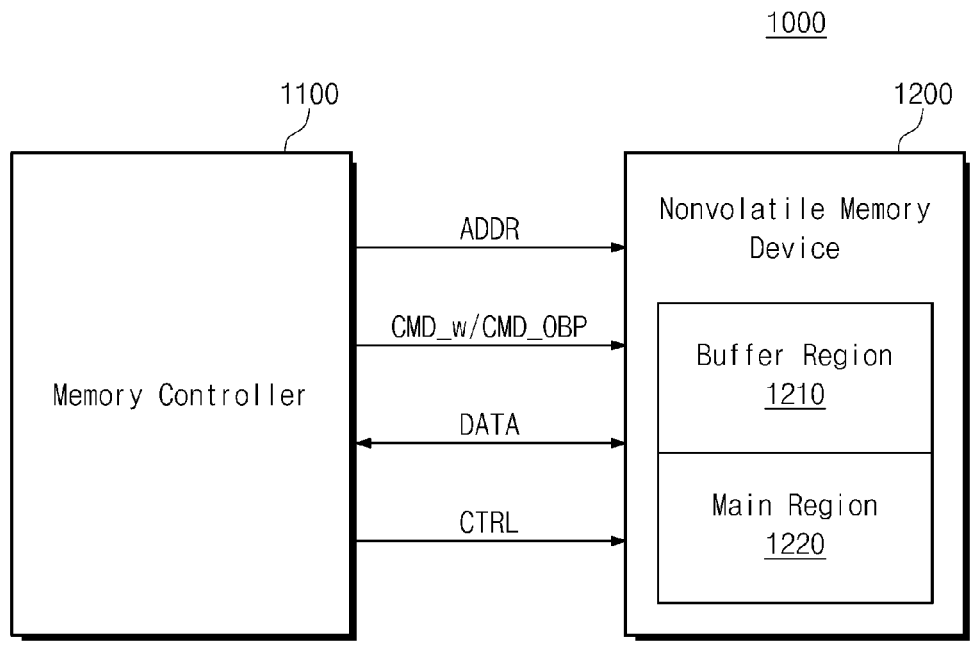
FIG. 12 is a block diagram of a nonvolatile memory system according an exemplary embodiment.

FIG. 12 is a block diagram of a nonvolatile memory system according to another exemplary embodiment. Referring to FIG. 12, the nonvolatile memory system 1000 includes a memory controller 1100 and a nonvolatile memory device 1200. The memory controller 1100 may transmit an address ADDR, a write command CMD_w, an OBP command CMD_OBP, and a control signal CTRL to the nonvolatile memory device 1200. The memory controller 1100 may exchange data with the nonvolatile memory device 1200. In some embodiments, the address ADDR may include a physical address of a main region 1220 included in the nonvolatile memory device 1200 and a physical address of a buffer region 1210 included in the nonvolatile memory device 1200. In some embodiments, the data may include a plurality of page data PD, and each of the page data PD may include a plurality of sub-page data sPD.

The nonvolatile memory device 1200 may include the buffer region 1210 and the main region 1220. The nonvolatile memory device 1200 may perform a program operation in response to received signals. For example, the nonvolatile memory device 1200 may perform pre-main program operation (PMP) such that some of received data is written at the main region 1220. The nonvolatile memory device 1200 may perform buffered program operation (BP) such that the other data DATA is written at the buffer region 1210. And then, the nonvolatile memory device 1200 may read the data, subjected to the buffered program operation (BP), from the buffer region 1210 and may perform re-main program operation (RMP) such that the read data is written at the main region 1220 subjected to pre-main programming (PMP). The nonvolatile memory device 1200 may perform this sequence of operations based on pre-main programming (PMP), buffered programming (BP), and re-main programming (RMP) described with reference to FIGS. 4 to 11. In some embodiments, the nonvolatile memory device 1200 may perform buffered program operation (BP) on the buffer region 1210 according to a predetermined order.

In some embodiments, the re-main program operation (RMP) may be performed according to the control of the memory controller 1100. For example, the memory controller 1100 may control the nonvolatile memory device 1200 such that data is subjected to re-main programming (RMP) or buffered programming (BP) at the nonvolatile memory device 1200. Then, when an idle state is maintained for a predetermined time, the memory controller 1100 may control the nonvolatile memory device 1200 such that the data subjected to BP is subjected to re-main-program operation (RMP).

Figure 13:
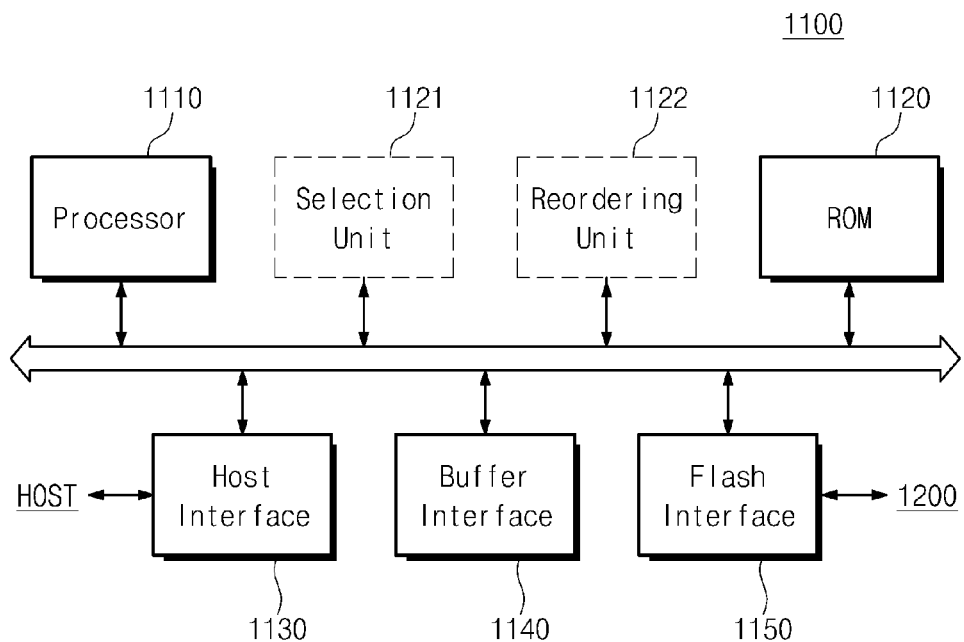
FIG. 13 is a block diagram of a memory controller in FIG. 12.

FIG. 13 is a block diagram of the memory controller 1100 in FIG. 12. Referring to FIGS. 12 and 13, the memory controller 1100 may include a processor 1110, a ROM 1120, a host interface 1130, a buffer interface 1140, a flash interface 1150, a selection unit 1121 (e.g., selector 1121), a reordering unit 1122 (e.g., reorderer 1122).

The processor 1110 may control the overall operation of the memory controller 1100. The ROM 1120 may include data or programmed required to operate the memory controller 1100. The data or programs included in the ROM 1120 may be provided in the form of firmware.

The memory controller 1100 may communicate with the host interface 1130 based on a host. The memory controller 1100 may communicate with an external buffer memory (not shown) based on the buffer interface 1140. The memory controller 1100 may communicate with the nonvolatile memory device 1200 based on the flash interface 1150.

The selection unit 1121 may select sub-page data to be subjected to pre-main program operation (PMP) among a plurality of sub-page data sPD included in page data PD. For example, the selection unit 1121 may select sub-page data to be subjected to pre-main program operation (PMP) based on the method described with reference to FIGS. 1 to 12. In some exemplary embodiments, information associated with the sub-page data selected by the selection unit 1121 may be stored in the ROM 1120.

The reordering unit 1122 may reorder data received from the host, based on information associated with selected sub-page data. For example, the ordering unit 1122 may reorder a plurality of sub-page data received from the host such that selected one of the received sub-page data is transmitted to the nonvolatile memory device earlier than the other sub-page data.

In some exemplary embodiments, the selection unit 1121 and the reordering unit 1122 may be implemented in the form of firmware to be stored in the ROM 1120 and may be driven by the processor 1110.

Figure 14:
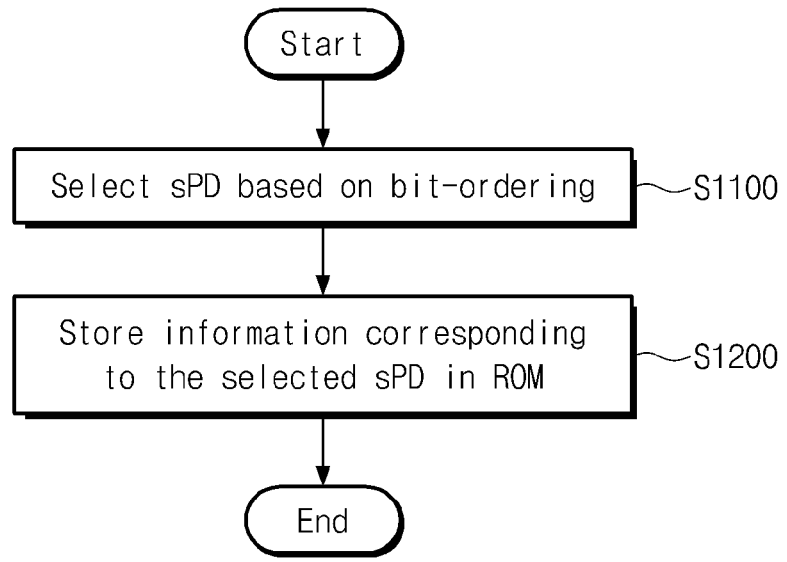
FIG. 14 is a flowchart describing an operation of the memory controller in FIG. 13.

FIG. 14 is a flowchart describing an operation of the memory controller 1100 in FIG. 13. In FIG. 14, a method for operating the selection unit 1121 of the memory controller 1100 will be described.

Referring to FIGS. 12 to 14, in a step S1100, the memory controller 1100 may select sub-page data sPD based on bit ordering. For example, if each of memory cells of the nonvolatile memory device 1200 is a multi-level cell (MLC or QLC) storing 4 bits of data, single page data PD may include first to fourth sub-page data sPD1 to sPD4. In this case, the memory controller 1100 may select sub-page data to be subjected to pre-main program operation (PMP) among the first to fourth page data sPD1 to sPD4 based on bit ordering explained with reference to FIGS. 10 and 11.

In a step S1200, the memory controller 1100 may store information of the selected sub-page data in the ROM 1120. In some exemplary embodiments, some of a plurality of sub-page data may be subjected to pre-main program operation (PMP) based on the information stored in the ROM 1120. In some exemplary embodiments, the information of the selected sub-page may be stored in another storage circuit (e.g., register, fuse or the like).

Figure 15:
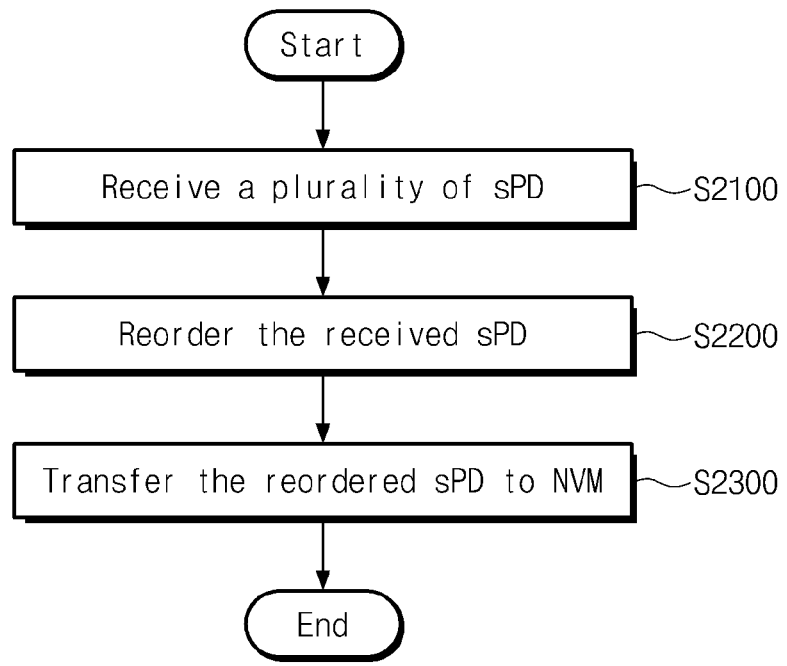
FIG. 15 is a flowchart describing another operation of the memory controller in FIG. 13.

FIG. 15 is a flowchart describing another operation of the memory controller 1100 in FIG. 13. In FIG. 15, the operation of the reordering unit 1121 of the memory controller 1100 will now be described.

Referring to FIGS. 12 to 15, in a step S2100, the memory controller 1100 may receive a plurality of sub-page data sPD from an external device (e.g., host).

In a step S2200, the memory controller 1100 may reorder the received sub-page data sPD. For example, the memory controller 1100 may reorder the received sub-page data sPD based on information explained with reference to FIG. 13 (i.e., information of selected sub-page data). In some exemplary embodiments, the sub-page data sPD may be reordered such that a sub-page corresponding to selected sub-page data explained with reference to FIG. 13 is transmitted first to the nonvolatile memory device 1200.

In a step S2300, the memory controller 1100 transmits reordered sub-page data to the nonvolatile memory device 1200. For example, a plurality of sub-page data sPD may be reordered such that selected sub-page data is transmitted first to the nonvolatile memory device 1200. The memory controller 1100 may transmit selected sub-page data first to the nonvolatile memory device 1200 based on reordered sub-page data. In some exemplary embodiments, the memory controller 1100 may transmit selected sub-page data together with an OBP command CMD_OBP.

In some exemplary embodiments, the nonvolatile memory device 1200 may receive selected sub-page data and perform pre-main programming (PMP) on the received data into the main region 1220.

According to the above exemplary embodiments, the memory controller 1100 may select sub-page data to be subjected to pre-main program operation (PMP) among a plurality of sub-page data sPD constituting data page PD. The memory controller 1100 may control the nonvolatile memory device 1200 such that the selected sub-page data is subjected to pre-main program operation (PMP) at the main region 1220. Thus, since an On-chip Buffered Programming (OBP) operation may be performed with minimal use of the buffer region 1210, a nonvolatile memory system with improved performance and improved lifetime is provided.

Figure 16:
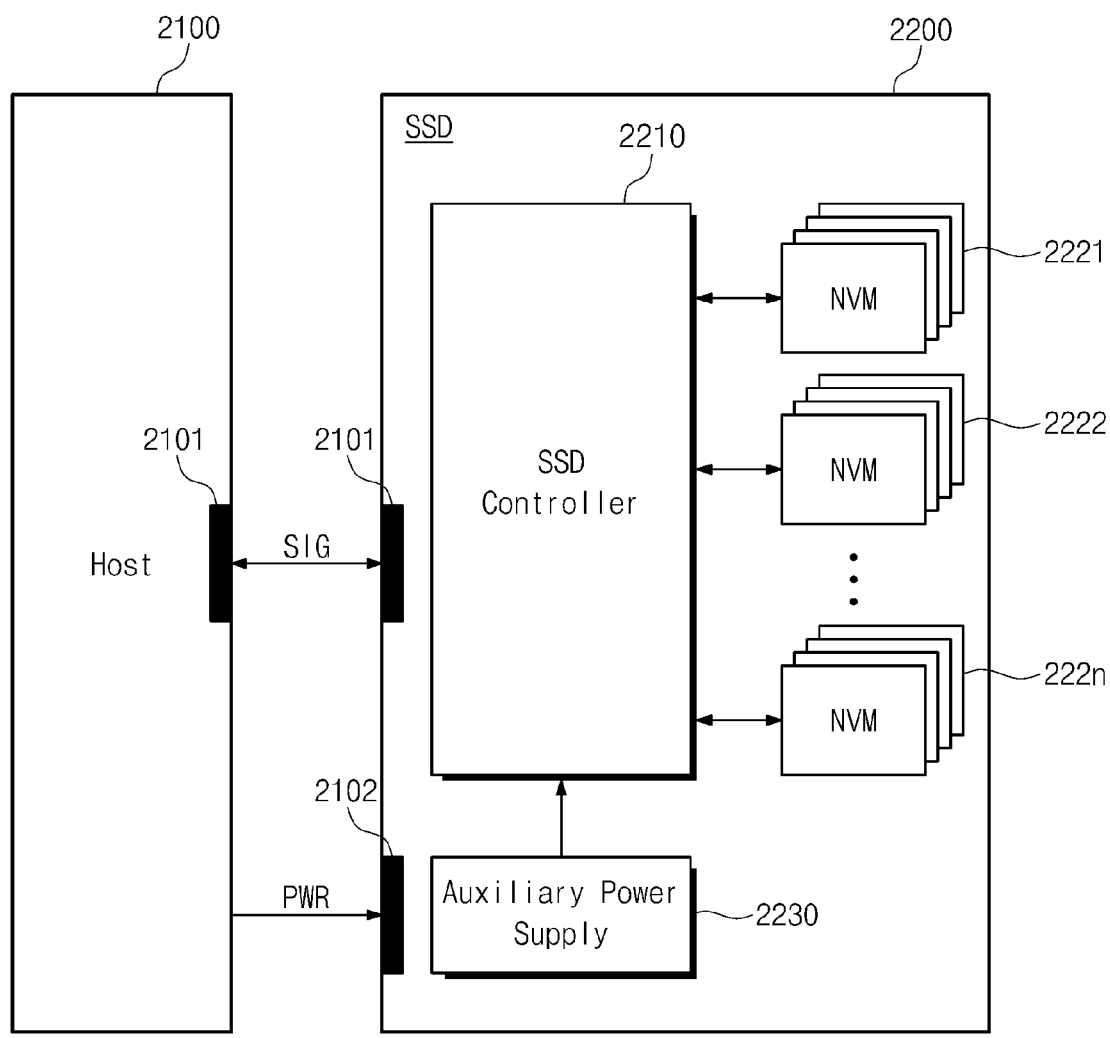
FIG. 16 is a block diagram of a solid-state drive (SSD) system to which a nonvolatile memory device according to an exemplary embodiment is applied.

FIG. 16 is a block diagram of a solid-state drive (SSD) system 2000 to which a nonvolatile memory device according to an exemplary embodiment is applied. As illustrated, the SSD system 2000 includes a host 2100 and an SSD 2200.

The host 2100 writes data into the SSD 2200 or reads data stored in the SSD 2200. The host 2100 may exchange a signal SGL such as a command, an address, a signal SGL with the SSD 2200 through a host interface 2101. In some embodiments, the host interface 2101 may include various interfaces Universal Serial Bus (USB), multimedia card (MMC), peripheral component interconnection (PCI), PCI-express (PCI-E), Advanced Technology Attachment (ATA), Serial-ATA, Parallel-ATA, small computer small interface (SCSI), enhanced small disk interface (ESDI), Integrated Drive Electronics (IDE), Mobile Industry Processor Interface (MIPI), UFS (Universal Flash Storage), nonvolatile memory express (NVM-e) and so on.

The SSD 2200 may exchange the signal SGL with the host 100 through the host interface 2101 and receives power through a power connector 2102. The SSD 2200 may include a plurality of nonvolatile memory devices 2221 to 222n, an SSD controller 2210, and an auxiliary power supply 4230. Each of the nonvolatile memory devices 2221 to 222n may be implemented using PRAM, MRAM, ReRAM, and FRAM other than a NAND flash memory.

The nonvolatile memory devices 2221 to 222n are used as a storage medium of the SSD 2200. The nonvolatile memory devices 2221 to 222n may be connected to the SSD controller 2210 through a plurality of channels CH1 to CHn. One or more nonvolatile memory devices may be connected to a single channel. The nonvolatile memory devices connected to the single channel may be connected to the same data bus.

The SSD controller 1210 may exchange a signal SGL with the host 2100 through the host interface 2201. The signals SGL may include a command, an address, data, and the like. The SSD controller 2210 may write data into a corresponding nonvolatile memory device or read data from a corresponding nonvolatile memory device.

The auxiliary power supply 2230 may be connected to the host 2100 through a power connector 2102. The auxiliary power supply 2230 may receive power PWR from the host 2100 to be charged. The auxiliary power supply 2230 may be disposed inside or outside the SSD 2200. For example, the auxiliary power supply 2230 may be disposed on a main board to supply auxiliary power to the SSD 2200.

In some embodiments, each of the nonvolatile memory devices 2221 to 222n may operate based on a program scheme described with reference to FIGS. 1 to 11. Alternatively, the SSD controller 4210 and each of the nonvolatile memory devices 2221 to 222n may operate based on a program scheme described with reference to FIGS. 12 to 15.

Figure 17:
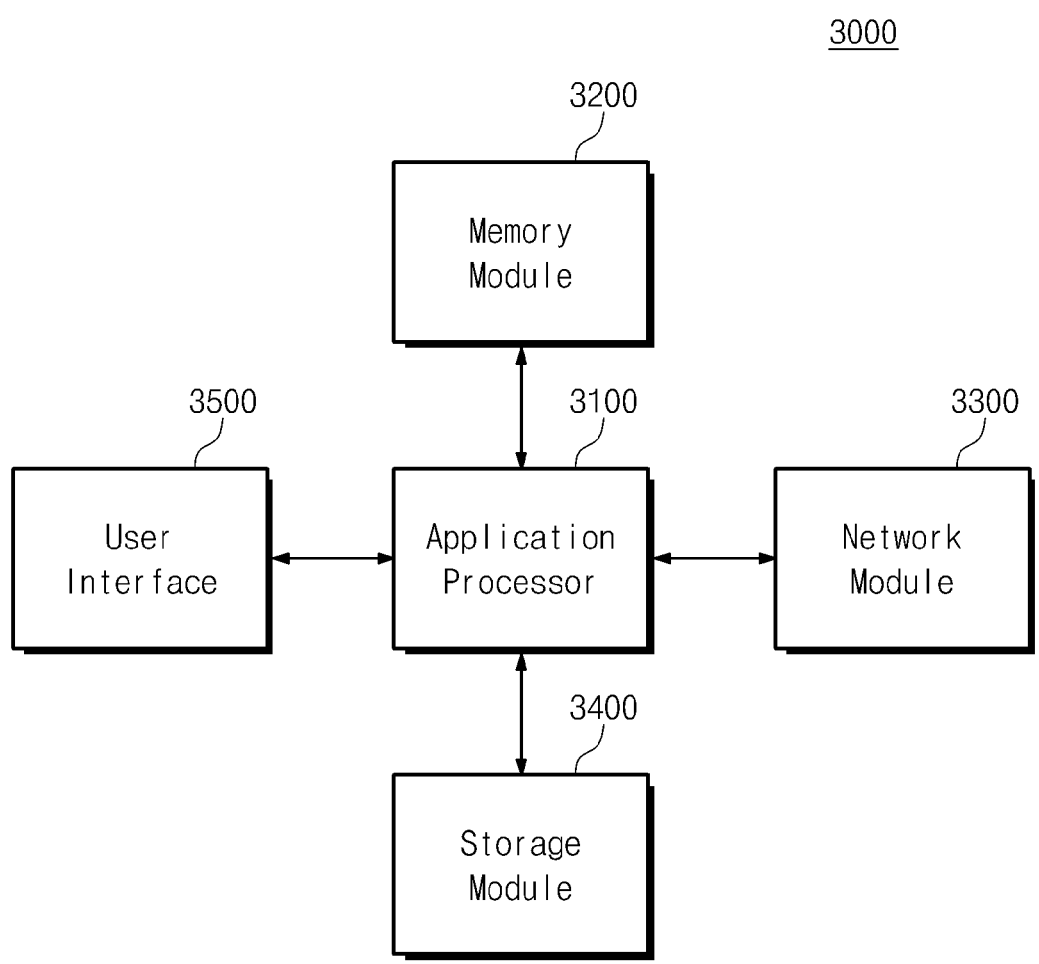
FIG. 17 is a block diagram of a user system to which a memory system according to the exemplary embodiments is applied.

FIG. 17 is a block diagram of a user system 3000 to which a memory system according to the exemplary embodiments is applied. In FIG. 17, the user system 3000 includes an application processor 3100, a memory module 3200, a network module 3300, a storage module 3400, and a user interface 3500. In some embodiments, the user system 3000 may be provided as one of computing systems such as an ultra-mobile PC (UMPC), a workstation, a net-book, a personal digital assistant (PDA), a portable computer, a web tablet, a wireless phone, a mobile phone, a smart phone, an e-book, a portable multimedia player (PMP), a portable game device, a navigation device, a black box, a digital camera, a digital multimedia broadcasting (DMB) player, a digital audio recorder, a digital audio player, a digital picture recorder, a digital picture player, a digital video recorder, and a digital video player.

The application processor 3100 may drive components incorporated in the user system 3000, an operating system (OS), and the like. In some exemplary embodiments, the application processor 3100 may include controllers to control components incorporated in the user system 3000, a graphic engine, and various interfaces.

The memory module 3200 may operate as a main memory, a working memory, a buffer memory or a cache memory of the user system 3000. The memory module 3200 may include a volatile random access memory such as dynamic random access memory (DRAM), synchronous DRAM (SDRAM), double data rate SDRAM (DDR SDRAM), DDR2 SDRAM, DDR3 SDRAM, low power DDR DRAM (LPDDR DRAM), LPDDR2 DRAM, LPDDR3, DRAM and a nonvolatile random access memory such as PRAM, ReRAM, MRAM, and FRAM.

The network module 3300 may communicate with external devices. In some embodiments, the network module 3300 may support wireless communication such as Code Division Multiple Access (CDMA), Global System for Mobile communication (GSM), wideband CDMA (WCDMA), CDMA-2000, Time Division Multiple Access (TDMA), Long Term Evolution (LTE), Wimax, WLAN, UWB, Bluetooth, and WI-DI.

The storage module 3400 may store data. For example, the storage module 3400 may store externally received data. Alternatively, the storage module 3400 may transmit its stored data to the application processor 3400. In some embodiments, the storage module 3400 may be implemented using a semiconductor memory device such as a phase-change RAM (PRAM), a magnetic RAM (MRAM), a resistive RAM (RRAM), a NAND flash memory, a NOR flash memory, a three-dimensional NAND flash memory. In some embodiments, the storage module 3400 may include a plurality of nonvolatile memory devices. The nonvolatile memory devices may be nonvolatile memory devices explained with reference to FIGS. 1 to 11. Alternatively, the storage module 5400 may perform a program operation based on an OBP operation explained with reference to FIGS. 4 to 12. In some embodiments, the storage module 3400 may include a memory controller and a plurality of nonvolatile memory devices. The memory controller and the nonvolatile memory devices may operate based on an operation scheme explained with reference to FIGS. 12 to 15.

The user interface 3500 may include interfaces to input data or a command to the application processor 3100 or to output data to an external device. In some exemplary embodiments, the user interface 3500 may include input devices such as a camera, a touch screen, an operation recognition module, and a microphone or output devices such as a display, a speaker, and a touch screen.

According to the above-described embodiments, a nonvolatile memory device may include a buffer region and a main region and perform an on-chip buffered programming (OBP) operation. The nonvolatile memory performs pre-main program operation (PMP) such that some of data is written at the main region and performs buffered program operation (BP) such that the other data is written at the buffer region. Then, the nonvolatile memory device reads the data, subjected to the buffered program operation (BP), from the buffer region and performs re-main program operation (RMP) such that the read data is written at the main region. The nonvolatile memory device performs the OBP operation based on the above operations.

Thus, since the OBP operation may be performed with minimal use of the buffer region, a nonvolatile memory system with improved performance and improved lifetime is provided.

In the above-described exemplary embodiments, it has been assumed that a memory cell array has a three-dimensional structure. However, the exemplary embodiments are not limited thereto. The inventive concept may be applied to two-dimensional nonvolatile memory devices (e.g., 2D NAND flash memory).

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. For example, it is possible to adjust the driving capability of a sub word line driver or adjust the slope of level of applied driving signals by changing, adding, or removing the circuit configuration or arrangement in the drawings without departing from the technical spirit of the present disclosure in other cases.

What is claimed is:

1. An operating method of a nonvolatile memory device which includes a buffer region including a first plurality of memory cells and a main region including a second plurality of memory cells, the method comprising:
   receiving a plurality of sub-page data and a write command from an external device;
   performing a pre-main program operation such that at least one of the plurality of sub-page data is stored in the second plurality of memory cells included in the main region;
   performing a buffered program operation such that other received sub-page data is stored in the first plurality of memory cells included in the buffer region; and
   performing a re-main program operation such that the received sub-page data subjected to the buffered program operation at the buffer region is stored in the second plurality of memory cells subjected to the pre-main program operation,
   wherein each of the first plurality of memory cells in the buffer region stores N-bit data, each of the second plurality of memory cells in the main region stores M-bit data, each of the plurality of sub-page data indicate data stored in a single page of the nonvolatile memory device,
   wherein N is a positive integer and M is a positive integer which is greater than N, and
   wherein the pre-main programming and the re-main programming are performed based on bit ordering which indicates a corresponding relationship between data stored in a memory cell in the main region and a plurality of program states.

2. The operating method as set forth in claim 1, wherein the performing the re-main program operation comprises:
   reading the received sub-page data, subjected to the buffered program operation, from the buffer region; and
   performing the re-main program operation such that the read sub-page data is stored in the second plurality of memory cells subjected to pre-main program operation.

3. The operating method as set forth in claim 1, wherein the re-main program operation is an operation to reprogram the other sub-page data into the second plurality of memory cells subjected to the pre-main program operation.

4. The operating method as set forth in claim 1, wherein the write command is an on-chip buffered program (OBP) command.

5. The operating method as set forth in claim 1, further comprising:
   receiving an address from the external device,
   wherein the pre-main program operation is performed such that the at least one of the plurality of sub-page data is stored in a third plurality of memory cells which correspond to the address among the second plurality of memory cells in the main region.

6. The operating method as set forth in claim 1, further comprising:
   receiving a buffer address from the external device,
   wherein the buffered program operation is performed such that the other sub-page data is stored in a third plurality of memory cells which correspond to the buffer address among the first plurality of memory cells in the buffer region.

7. The operation method as set forth in claim 1, wherein the nonvolatile memory device includes a memory cell array including the buffer region and the main region, and the memory cell array includes a plurality of cell strings,
   wherein each of the plurality of cell strings includes a third plurality of memory cells which is stacked to be perpendicular to a substrate, a ground selection transistor provided between the third plurality of memory cells and the substrate, and a string selection transistor provided between the third plurality of memory cells and a bitline.

8. The operating method as set forth in claim 1, wherein the at least one sub-page data subjected to the pre-main programming is predetermined sub-page data which satisfies a reference condition,
   wherein the reference condition indicates a condition in which an upper limit of a threshold voltage distribution of a program state of the second plurality of memory cells subjected to the pre-main programming is made maximum.

9. An operating method of a nonvolatile memory device which includes a plurality of memory cells, the method comprising:
   performing a first program operation such that N-bit data is stored in at least one of the plurality of memory cells;
   performing a second program operation in the plurality of memory cells which have been programmed with a first program operation, such that M-bit data is stored;
   wherein the second program operation is performed in the plurality of memory cells subjected to the first program operation,
   wherein N is a positive integer and M is a positive integer which is greater than N,
   wherein the nonvolatile memory device includes a first region including the at least one of the plurality of memory cells and a second region including other memory cells,
   wherein the operating method further comprises receiving a plurality of sub-page data and a write command from an external device; and performing a third program operation such that at least one of the plurality of sub-page data is stored in the other memory cells included in the second region,
   wherein the performing the first program operation comprises performing the first program operation such that other received sub-page data is stored in the at least one of the plurality of memory cells included in the first region,
   wherein the performing the second program operation comprises performing the second program operation such that the received sub-page data subjected to the third program operation at the second region is stored in the at least one of the plurality of memory cells subjected to the first program operation,
   wherein the at least one of a plurality of memory cells programmed with the first program operation stores N-bit data, at least one of a plurality of memory cells programmed with the second program operation stores M-bit data, and at least one of a plurality of memory cells programmed with the third program operation stores L-bit data, and
   wherein N is a positive integer, L is a positive integer which is lower than M.

10. The operating method as set forth in claim 9, wherein N is two and M is four.

11. The operating method as set forth in claim 9, wherein M is greater than four.

12. A nonvolatile memory system comprising:
a nonvolatile memory device including a first region and a second region; and
a memory controller configured to receive data from an external device, to store a part of the received data in the first region, and to store another part of the received data in the second region,
wherein the memory controller is configured to store the part of the received data, which is stored in the first region, in a plurality of memory cells which store another of the received data among a plurality of memory cells in the second region,
wherein the nonvolatile memory device is configured to read the part of the received data stored in the first region, and to perform a third program operation such that the read part of the received data is stored in the plurality of the memory cells storing another part of the received data among the plurality of memory cells in the second region under a control of the memory controller,
wherein the memory controller is configured to store L-bits data in the first region,
the memory controller is configured to store N-bits data in the second region and the memory controller is configured to store M-bits data in the second region, and
wherein L is a positive integer and N is a positive integer, and M is an integer which is greater than N.

13. The nonvolatile memory system as set forth in claim 12,
wherein each of the first region and the second region comprises a plurality of memory cells,
wherein each of the plurality of memory cells in the first region is configured to store L-bits data, and each of the plurality of memory cells in the second region is configured to store N-bits data, and
wherein L is a positive integer and N is a positive integer.

14. The nonvolatile memory system as set forth in claim 12,
wherein the nonvolatile memory device is configured to perform a first program operation such that the part of the received data is stored in the first region, and to perform a second program operation such that the rest of the received data is stored in the second region, and
wherein operation time of the first program operation is shorter than that of the second program operation.

* * * * *